US011527004B2

(12) United States Patent
Koo et al.

(10) Patent No.: US 11,527,004 B2
(45) Date of Patent: Dec. 13, 2022

(54) ELECTRONIC DEVICE AND OPERATION METHOD THEREOF

(71) Applicant: SAMSUNG ELECTRONICS CO., LTD., Suwon-si (KR)

(72) Inventors: Bonkon Koo, Suwon-si (KR);
Jongchul Choi, Suwon-si (KR);
Kyookeun Lee, Suwon-si (KR);
Jaeyun Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/167,778

(22) Filed: Feb. 4, 2021

(65) Prior Publication Data

US 2021/0248766 A1 Aug. 12, 2021

(30) Foreign Application Priority Data

Feb. 7, 2020 (KR) ........................ 10-2020-0015139

(51) Int. Cl.
| | |
|---|---|
| *G06F 3/01* | (2006.01) |
| *G06T 7/11* | (2017.01) |
| *G06T 7/55* | (2017.01) |
| *H04N 5/232* | (2006.01) |
| *G06T 7/73* | (2017.01) |
| *G06T 11/00* | (2006.01) |

(52) U.S. Cl.
CPC ................ *G06T 7/55* (2017.01); *G06F 3/013* (2013.01); *G06T 7/11* (2017.01); *G06T 7/73* (2017.01); *G06T 11/00* (2013.01); *H04N 5/23299* (2018.08)

(58) Field of Classification Search
CPC ..... G06F 3/011; G06F 3/013; H04N 5/23299; G06T 7/55; G06T 7/11; G06T 7/73; G06T 11/11
See application file for complete search history.

(56) References Cited

U.S. PATENT DOCUMENTS

| | | | |
|---|---|---|---|
| 8,793,620 | B2 | 7/2014 | Stafford |
| 9,250,703 | B2 | 2/2016 | Hernandez-Abrego et al. |
| 9,258,487 | B2 | 2/2016 | Lee et al. |
| 9,288,395 | B2 | 3/2016 | Baer et al. |
| 9,292,923 | B2* | 3/2016 | Srinivasan ............... G06T 7/60 |
| 9,667,868 | B2 | 5/2017 | Lee et al. |
| 9,784,988 | B2 | 10/2017 | Kim et al. |
| 10,180,572 | B2 | 1/2019 | Osterhout et al. |
| 10,979,685 | B1* | 4/2021 | Silverstein ............. G06F 3/013 |
| 11,217,021 | B2* | 1/2022 | Motta .................... G06F 3/015 |
| 2012/0162368 | A1 | 6/2012 | Choi |
| 2019/0297316 | A1* | 9/2019 | Bleyer ................ H04N 13/239 |

FOREIGN PATENT DOCUMENTS

| | | |
|---|---|---|
| JP | 10-90592 A | 4/1998 |
| KR | 10-2012-0073887 A | 7/2012 |

* cited by examiner

*Primary Examiner* — Lixi C Simpson
(74) *Attorney, Agent, or Firm* — Sughrue Mion, PLLC

(57) ABSTRACT

An electronic device including an eye tracking sensor configured to detect viewing direction of eye of a user; a camera; a tilting unit configured to adjust a direction of the camera; a memory; and a processor configured to obtain information about a gaze point of the user; determine a region of interest (ROI) based on the information about the gaze point; obtain two or more images including the ROI at different tilt angles; and determine depth information of the ROI by using the obtained two or more images.

16 Claims, 28 Drawing Sheets

ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2020-0015139, filed on Feb. 7, 2020, in the Korean Intellectual Property Office, the disclosure of which is incorporated herein by reference.

BACKGROUND

1. Field

The disclosure relates to an electronic device and an operation method thereof, and more particularly, to an electronic device that obtains depth information of a region of interest (ROI) that both eyes of a user are gazing at, and an operation method thereof.

2. Description of Related Art

The real space in which we live includes three-dimensional (3D) coordinates. Humans perceive this 3D space with a stereoscopic effect by combining visual information seen by both eyes. However, photos or videos are taken by a general digital device with technology that expresses 3D coordinates as two-dimensional (2D) coordinates and do not include information about space. In order to express such a sense of space, 3D cameras or display products that capture and display stereoscopic images using two cameras together are emerging.

In order to express a sense of space, depth information about real space needs to be sensed. In depth information sensing according to the related art, depth sensing is performed on a full range of spaces that may be measured by a depth sensor without considering a region of interest of a user. In particular, in the case of a depth sensor that performs depth sensing by projecting light, to project light (for example, infrared light (IR)) onto the full range of space, an infrared light-emitting diode (IR LED) is driven, which increases power consumption due to the driving of the IR LED.

In addition, to obtain depth information of the full range of spaces, an amount of calculation increases, and accordingly, power consumption increases. As the power consumption of the depth sensor increases, there is a problem in that it is difficult to mount the depth sensor on a small device.

Therefore, to provide users with various services using depth information even in daily life by mounting a depth sensor on a small device such as augmented reality (AR) glasses, research on a method of performing depth sensing on a region of interest of the user is required, and research on miniaturization and low power consumption of the depth sensor is required.

SUMMARY

Provided are an electronic device that obtains depth information of a region of interest (ROI) that both eyes of a user are gazing at, and an operation method thereof.

Also, provided are an electronic device that determines depth information of an ROI based on two or more images obtained using a single camera, and an operation method thereof.

According to an aspect of the disclosure, an electronic device includes an eye tracking sensor configured to obtain view information corresponding to viewing direction of eye of a user; a camera; a tilting unit configured to adjust a direction of the camera; a memory storing one or more instructions; and at least one processor configured to execute the one or more instructions to: obtain information about a gaze point of the user based on the obtained view information; determine a region of interest (ROI) based on the information about the gaze point; obtain two or more images including the ROI by controlling the tilting unit such that the two or more images are obtained by the camera in first direction and second direction based on a predetermined tilting angle; and determine depth information of the ROI by using the obtained two or more images.

The at least one processor may be further configured to: obtain two-dimensional (2D) position information of the gaze point, based on the view information, determine a tilting pivot of the camera, based on the 2D position information, and control the tilting unit to tilt the camera, based on the determined tilting pivot.

The at least one processor may be further configured to: obtain an estimated distance between the electronic device and the gaze point, based on the view information, determine a tilting angle of the camera based on the estimated distance, and control the tilting unit to tilt the camera based on the determined tilting angle.

The at least one processor may be further configured to determine an operation mode of the electronic device, determine a tilting angle of the camera, based on tolerance information of depth information corresponding to the operation mode, and control the tilting unit to tilt the camera based on the determined tilting angle.

The electronic device may further include a display. The at least one processor may be further configured to control the display to display at least one virtual object that appears to be at a depth of the ROI, based on the determined depth information of the ROI.

The at least one processor may be further configured to: determine a target object within the ROI, extract a feature point of the target object by using a previously determined object analysis algorithm, determine a tilting pivot of the camera, based on the feature point of the target object, and control the tilting unit to tilt the camera based on the determined tilting pivot.

The at least one processor may be further configured to: obtain two or more images each based on the determined tilting pivot being applied to the camera, by controlling the tilting unit based on the determined tilting pivot, and determine depth information of the target object by using the obtained two or more images.

The electronic device may further include a display. The at least one processor may be further configured to control the display to display at least one virtual object that appears to be at a depth of the target object, based on the determined depth information of the target object.

The at least one processor may be further configured to determine depth information of the ROI by using the obtained two or more images, based on an algorithm for calculating depth information.

According to another aspect of the disclosure, An operation method of an electronic device may include obtaining, by an eye tracking sensor, view information corresponding to viewing direction of eye of a user; obtaining information about a gaze point of the user based on the obtained view information; determining a region of interest (ROI) based on the information about the gaze point; obtaining two or more images including the ROI by controlling a tilting module such that the two or more images are obtained in first direction and second direction based on a predetermined tilting angle; and determining depth information of the ROI by using the obtained two or more images.

The obtaining of the information about the gaze point may include obtaining two-dimensional (2D) position information of the gaze point, based on the view information, and the obtaining of the two or more images may include determining a tilting pivot of a camera, based on the 2D position information, and controlling the tilting module to tilt the camera, based on the determined tilting pivot.

The obtaining of the information about the gaze point may include obtaining an estimated distance between the electronic device and the gaze point, based on the view information, and the obtaining of the two or more images may include determining a tilting angle of a camera based on the estimated distance, and controlling the tilting module to tilt the camera based on the determined tilting angle.

The obtaining of the two or more images may include determining an operation mode of the electronic device, determining a tilting angle of a camera, based on tolerance information of depth information corresponding to the operation mode, and controlling the tilting module to tilt the camera based on the determined tilting angle.

The method may further include displaying at least one virtual object that appears to be at a depth of the ROI, based on the determined depth information of the ROI.

The obtaining of the two or more images may include determining a target object within the ROI, extracting a feature point of the target object by using a previously determined object analysis algorithm, determining a tilting pivot of a camera based on the feature point of the target object, and controlling the tilting module to tilt the camera based on the determined tilting pivot.

The obtaining of the two or more images may include obtaining two or more images each based on the determined tilting pivot being applied to the camera, by controlling the tilting module based on the determined tilting pivot. The obtaining of the depth information of the gaze point may include determining depth information of the target object by using the obtained two or more images.

The method may further include displaying at least one virtual object that appears to be at a depth of the target object, based on the determined depth information of the target object.

The determining of the depth information of the ROI may include determining depth information of the ROI by using the obtained two or more images, based on an algorithm for calculating depth information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
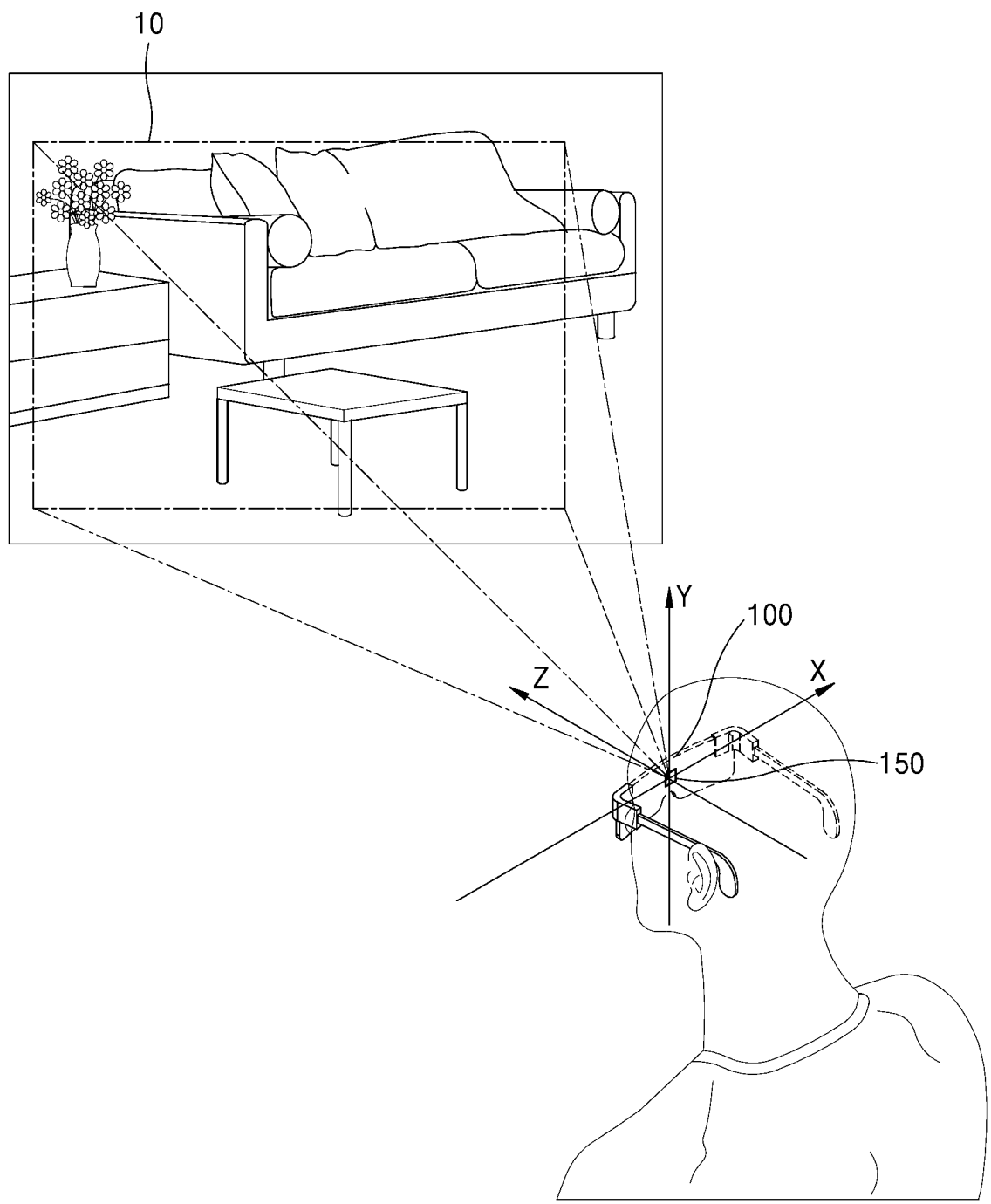
FIG. 1 is a diagram schematically illustrating an electronic device according to an embodiment.

Hereinafter, the disclosure will be described in detail by explaining example embodiments of the disclosure with reference to the attached drawings. The disclosure may, however, be embodied in many different forms and should not be construed as being limited to the example embodiments of the disclosure set forth herein. In the drawings, parts not related to the disclosure are not illustrated for clarity of explanation, and like reference numerals denote like elements throughout. With regard to the description of the drawings, similar reference numerals may be used to designate similar or relevant elements.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Therefore, it is noted that the terms used herein are construed based on practical meanings thereof and the whole content of this specification, rather than being simply construed based on names of the terms.

Terms such as "first" and "second" may be used to designate various elements, but the elements should not be limited by these terms. These terms are merely used to distinguish one element from another.

Terms in the following description are merely used to describe specific embodiments of the disclosure, and are not intended to limit the scope of the disclosure. The singular forms "a", "an", and "the" are intended to include the plural forms as well, unless the context clearly indicates otherwise. Throughout the specification, when an element is referred to as being "connected to" another element, the element may be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

The definite article "the" or other demonstratives may indicate both a singular form and a plural form. Unless the context clearly indicates otherwise, operations included in a method according to an embodiment of the disclosure may be performed in an appropriate order. The order of describing the operations does not limit the scope of the disclosure.

The phrase "an embodiment of the disclosure" at various parts of this specification does not always designate the same embodiment of the disclosure.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executed by one or more processors. Furthermore, the disclosure might employ known technologies for electronic settings, signal processing, and/or data processing. Terms such as "mechanism", "element", "means", and "configuration" may be widely used and are not limited to mechanical and physical configurations.

In addition, connection lines or connection members between elements shown in the drawings merely illustrate examples of functional connections and/or physical or circuit connections. Connections between elements may be represented by replaceable or additional various functional connections, physical connections, or circuit connections in an actual device.

Throughout the disclosure, the expression "at least one of a, b or c" indicates only a, only b, only c, both a and b, both a and c, both b and c, all of a, b, and c, or variations thereof.

Reference will now be made in detail to embodiments of the disclosure, examples of which are illustrated in the accompanying drawings.

FIG. 1 is a diagram schematically illustrating an electronic device 100 according to an embodiment.

The electronic device 100 may be a glasses-type wearable device. The glasses-type wearable device may include a head mounted display (hereinafter referred to as "HMD") that may be mounted on the head.

As shown in FIG. 1, the electronic device 100 may be a HMD device.

For example, the HMD device may include an electronic device having a shape such as glasses, goggles, helmet, hat, etc., but is not limited thereto.

According to an embodiment, the term "user" refers to a person who controls functions or operations of the electronic device 100, and may include an administrator or an install engineer.

The electronic device 100 may be a device that provides at least one virtual object in the form of augmented reality (AR), mixed reality (MR), or virtual reality (VR).

When a virtual object is provided in the form of AR or MR, the electronic device 100 may display the virtual object on a display such that the virtual object appears in harmony with the shape, arrangement, distance, and depth of the real object in the real world. For example, the electronic device 100 may overlap and display an image of the virtual object on a real image of the real world. However, the disclosure is not limited thereto.

The electronic device 100 may include a depth sensor 150.

The depth sensor 150 may obtain depth information about one or more objects included in the real world. The depth information may correspond to a distance from the depth sensor 150 to a specific object. A depth value may increase as the distance from the depth sensor 150 to the specific object increases.

As shown in FIG. 1, in a three-dimensional (3D) space, the X-axis may be a reference axis that passes through the electronic device 100 from left to right, the Y-axis may be a reference axis that passes through the electronic device 100 from down to up, and the Z-axis may be a reference axis that passes through the electronic device 100 from back to front. In addition, the X-axis, Y-axis, and Z-axis may be perpendicular to each other.

Accordingly, the depth information may mean a distance on the Z axis from the depth sensor 150 to a specific object.

Figure 23:
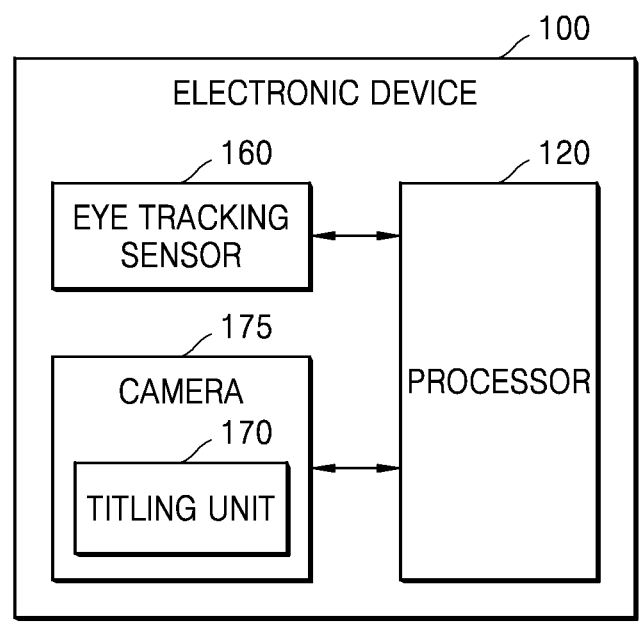
FIG. 23 is a block diagram of an electronic device according to an embodiment.

The depth sensor 150 may include a camera 175 (as shown in FIG. 23) including a tilting unit 170 (as shown in FIG. 23). For example, the camera 175 may be an RGB camera.

According to an embodiment, the tilting unit 170 may include a tilting actuator capable of rotating the camera 175 mounted on the electronic device 100. The electronic device 100 may adjust a capture direction which is a direction observed through a lens of the camera 175 by rotating the camera 175 according to the control of the tilting unit 170. Accordingly, the electronic device 100 may obtain two or more images captured in first and second directions which are different from each other using one camera 175.

According to an embodiment of the disclosure, the camera 175 including the tilting unit 170 will be referred to as a 'tilting camera'.

The depth sensor 150 may obtain depth information about a real space included in a field of view (FOV) of the camera 175. Hereinafter, a real space within a range that may be sensed by the depth sensor 150 will be referred to as an 'entire space'.

Figure 2:
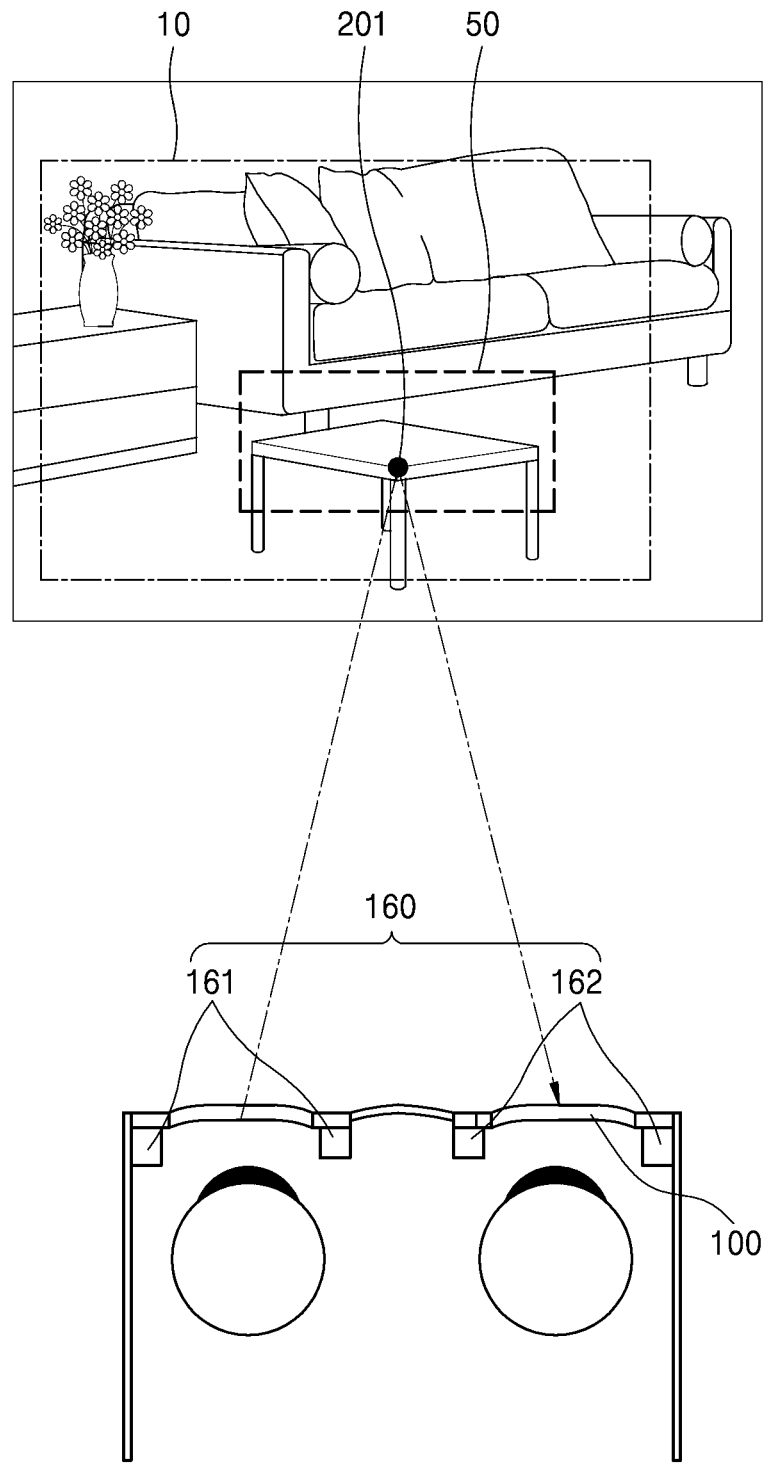
FIG. 2 is a diagram showing a method of determining a region of interest (ROI) based on view information of a user according to an embodiment

FIG. 2 is a diagram showing a region of interest (ROI) according to an embodiment.

According to an embodiment, when a user of the electronic device 100 gazes at a part of the entire space, depth information about the remaining space excluding the part of the space may be less important than depth information about the space at which the user gazes. For example, when the user of the electronic device 100 is gazing at a space 50 around a table among a room space (entire space 10) shown in FIG. 2 and obtains depth information about the entire space 10 using the depth sensor 150, the depth information about the remaining space except for the space 50 around the table may be less important than the depth information about the space 50 around the table.

Among the entire space 10, a point at which the user gazes and a peripheral region of the point at which the user gazes will be referred to as the ROI. The ROI according to an embodiment may be a previously set region with respect to the point at which the user gazes.

Referring to FIG. 2, the ROI may mean a point 201 at which a user gazes and a peripheral region 50 of the point 201 at which the user gazes among the entire space 10.

In addition, when the electronic device 100 obtains the depth information about the entire space 10, because an amount of calculation increases, power consumption may increase, and a response speed of the electronic device 100 may decrease. In addition, when the depth information is obtained by targeting the entire space 10, accuracy of the depth information about the gaze point 201 of the user of the electronic device 100 may be reduced.

Accordingly, the electronic device 100 according to an embodiment may determine the point 201 at which the user gazes among the entire space 10. For example, the electronic device 100 may obtain view information by tracking view of both eyes of the user, and determine the point (the gaze point) 201 at which the user gazes based on the view information.

According to an embodiment, the electronic device 100 may track the view of the user. According to an embodiment, the 'view' may mean a direction in which the user views. 'Eye tracking' means a process of measuring the view of the user (e.g., the point 201 at which the user gazes), and may be performed by tracking the position and movement of both eyes of the user.

The electronic device 100 may include an eye tracking sensor 160 to track the view of the user. The eye tracking sensor 160 according to may include a first eye tracking sensor 161 for tracking the view of the user's left eye and a second eye tracking sensor 162 for tracking the view of the right eye. The first eye tracking sensor 161 and the second eye tracking sensor 162 have the same structure and operate in the same manner.

Referring to FIG. 2, the electronic device 100 may determine the gaze point 201 at which the user is gazing using the eye tracking sensor 160.

For example, when the user of the electronic device 100 gazes at a space on a table among the entire space 10, to perform a certain function in relation to the space on the table that the user is interested in, depth information indicating a separation distance between the ROI 50 including the gaze point 201 at which the user is gazing and the electronic device 100 may be required.

According to an embodiment, the electronic device 100 may obtain the depth information of the ROI 50 to display a virtual object around the ROI 50 such that the virtual object appears in harmony with the shape, arrangement, distance, and depth of the real object in the real world.

A method, performed by the electronic device 100, of detecting the view information of the user, obtaining information about the gaze point of the user, and determining the ROI according to an embodiment will be described in more detail with reference to FIGS. 3A to 4B.

In addition, according to an embodiment, the electronic device 100 may determine the depth information of the ROI 50 by rotating the camera 175 and obtaining an image in two directions including first and second directions. A method, performed by the electronic device 100, of determining depth information of an ROI according to an embodiment will be described in detail with reference to FIGS. 5 to 23.

Figure 3A:
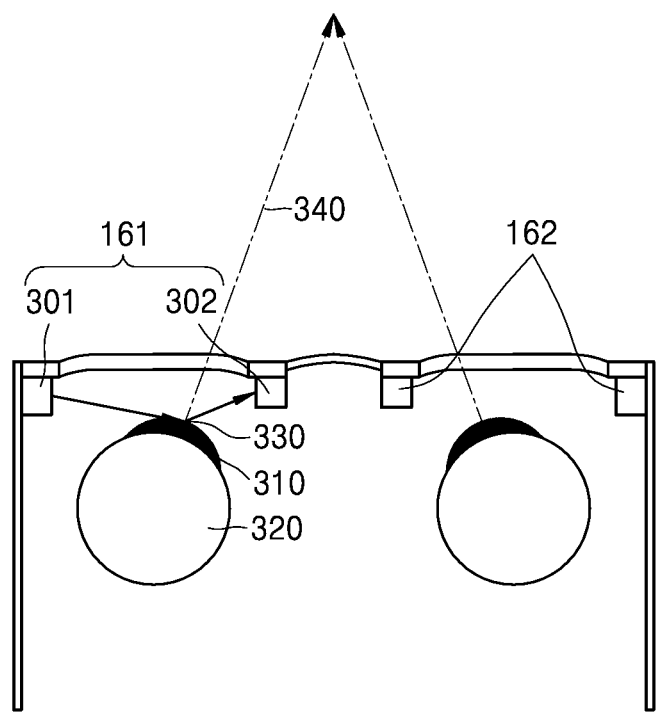
FIG. 3A is a diagram showing view information of a user according to an embodiment.

FIG. 3A is a diagram showing view information of a user according to an embodiment.

FIG. 3A shows a method of tracking view direction of the user based on an amount of reflection light reflected from a user's eye 320.

A first eye tracking sensor 161 and a second eye tracking sensor 162 according to an embodiment may have the same structure and operate in the same manner, and thus the first eye tracking sensor 161 will be described in FIG. 3A.

Referring to FIG. 3A, the first eye tracking sensor 161 may include an illuminator 301 that provides light to the user's eye 320 and a detector 302 that detects light. The illuminator 301 may include a light source that provides light and a scanning mirror that controls a direction of the light provided from the light source. The scanning mirror may control a direction such that the light provided from the light source is directed toward the user's eye 320 (e.g., a cornea 310). The scanning mirror may include a structure capable of reflecting the light provided from the light source and mechanically changing a reflection angle such that the light is directed toward the user's eye 320, and may scan a region including the cornea 310 using the light provided from the light source according to the changed reflection angle.

The detector 302 may detect the light reflected from the user's eye 320 and measure the amount of the detected light. For example, when the light is reflected from the center of the user's cornea 310, the amount of light detected by the detector 302 may be maximum. Accordingly, when the amount of light detected by the detector 302 is the maximum, the first eye tracking sensor 161 may determine a view direction 340 of the user's eye 320 based on a point 330 at which the light is incident on and reflected to the user's eye 320. For example, when the amount of reflected light is the maximum, the first eye tracking sensor 161 may determine the direction 340 connecting the point 330 at which the light is incident on and reflected to the user's eye 320 and a pivot of the user's eye 320 as the view direction 340 of the user's eye 320 (e.g., the user's left eye). However, the disclosure is not limited thereto.

In addition, the second eye tracking sensor 162 may also determine a view direction of a user's eye (e.g., the right eye) in the same manner as described in FIG. 3A.

Figure 3B:
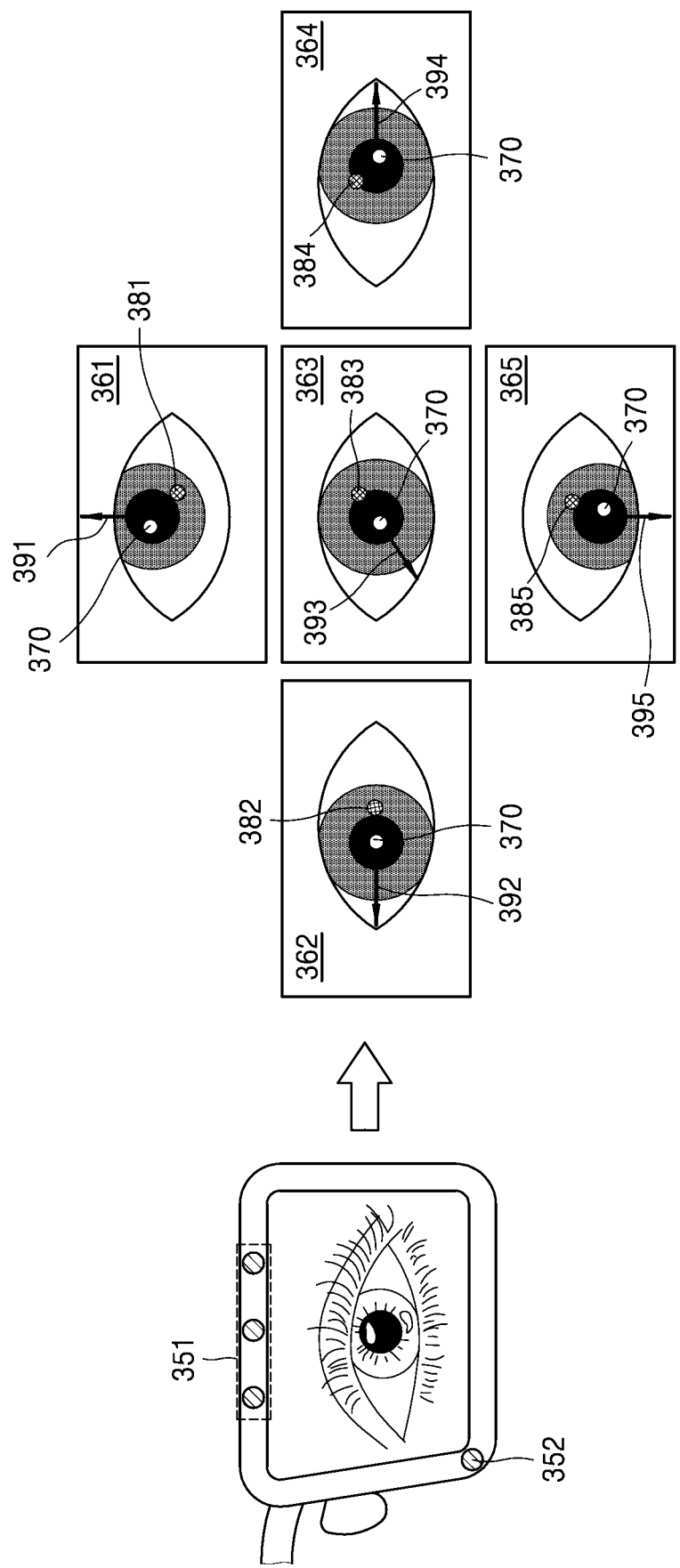
FIG. 3B is a diagram showing a method of detecting view information of a user according to an embodiment.

FIG. 3B is a diagram showing a method of detecting view information of a user according to an embodiment.

FIG. 3B shows a method of tracking view direction of the user based on a position of reflection light reflected from the user's eye.

The first eye tracking sensor 161 and the second eye tracking sensor 162 may have the same structure and may operate in the same manner, and thus the first eye tracking sensor 161 will be described in FIG. 3B. The first eye tracking sensor 161 may include an illuminator 351 and a capturer 352. The illuminator 351 may include an infrared light emitting diode (IR LED) or the like. As shown in FIG. 3B, the illuminator 351 may include a plurality of light emitting diodes disposed at different positions. The illuminator 351 may provide light (e.g., infrared light) to the user's eye when capturing the user's eye. As light is provided to the user's eye, the reflection light may be generated in the user's eye.

In addition, the capturer 352 may include at least one camera. In this regard, the at least one camera may include an infrared camera IR. The electronic device 100 may track view of the user's eye (e.g., the user's left eye) by using an image of the user's eye captured by the capturer 352. For example, the first eye tracking sensor 161 may track the view of the user by detecting a pupil and the reflection light from the image of the user's eye. The first eye tracking sensor 161 may detect positions of the pupil and the reflection light from the image of the user's eye, and determine a view direction of the user's eye based on a relationship between the position of the pupil and the position of the reflection light.

For example, the first eye tracking sensor 161 may detect a pupil 370 and a reflection light 381 from a captured first eye image 361, and determine a view direction 391 of the user's eye based on a relationship between the position of the pupil 370 and the position of the reflection light 381. In the same manner, the first eye tracking sensor 161 may detect the pupil 370 and reflection lights 382, 383, 384, and 385 from second to fifth eye images 362, 363, 364, and 365, respectively and may determine view directions 392, 393, 394, and 395 of the user's eye based on relationships between positions of the pupil 370 and positions of the reflection lights 382, 383, 384, and 385.

In addition, the second eye tracking sensor 162 may also determine the view direction of the user's eye (e.g., the right eye) in the same manner as described in FIG. 3B.

Figure 3C:
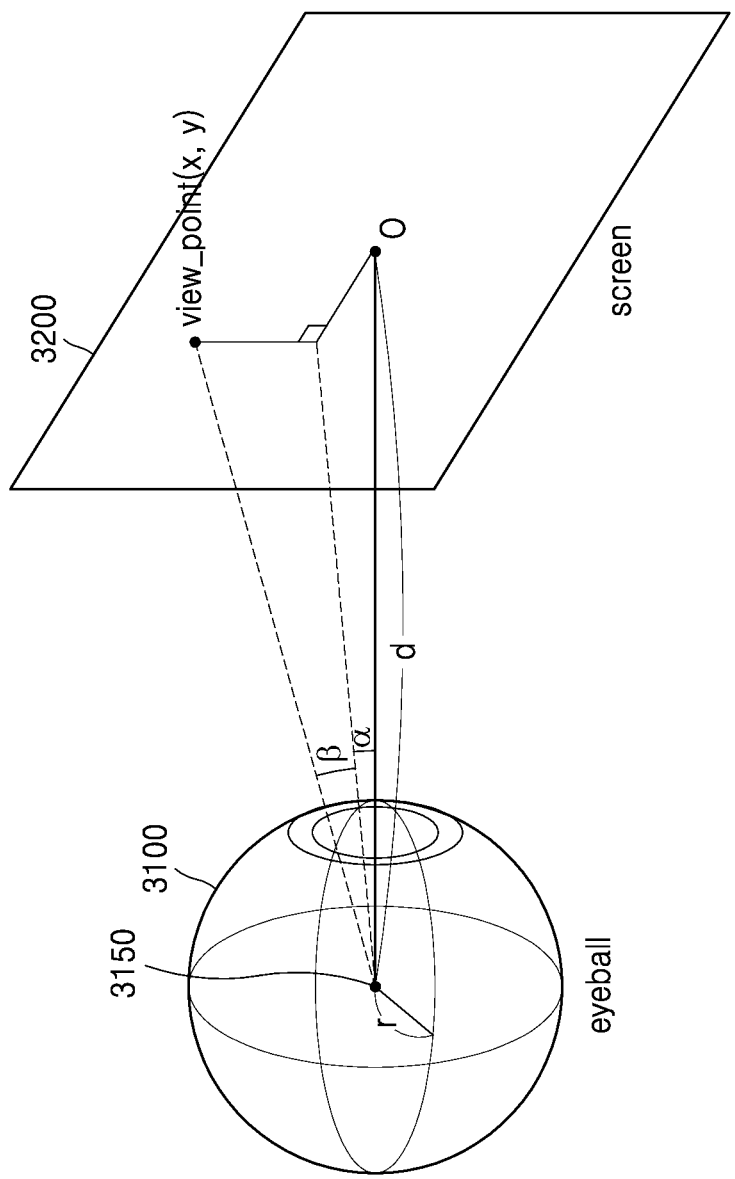
FIG. 3C is a diagram showing information about a gaze point based on view information of a user, according to an embodiment.

FIG. 3C is a diagram showing information about a gaze point based on view information of a user, according to an embodiment.

According to an embodiment, the information about the gaze point may include 2D position information of a point at which the user gazes.

FIG. 3C shows a three-dimensional (3D) eyeball model of the user.

Referring to FIGS. 2 and 3C, the electronic device 100 may determine a view direction of the user's left eye by using the first eye tracking sensor 161, and may determine a view direction of the user's right eye by using the second eye tracking sensor 162. For example, the electronic device 100 may determine the view direction based on an average eyeball model of humans. The eyeball model may be modeled by assuming that an eyeball 3100 of a human has a spherical shape and ideally rotates according to the view direction. In addition, the eye model may be mathematically expressed as Equations 1 and 2 below.

$x = d \cdot \tan \alpha,$ $y = d \cdot \sec \alpha \cdot \tan \beta,$ [Equation 1]

$\beta = \sin^{-1}(\text{diff\_}y/r),$ $\alpha = \sin^{-1}(\text{diff\_}x/r \cos \beta).$ [Equation 2]

In Equation 1, d denotes a distance between a center 3150 of the user's eye and a virtual screen 3200, α denotes an angle at which the user's eye rotates in the x-axis direction with respect to a case where the user's eye gazes at the front of the virtual screen 3200, and β denotes an angle at which the user's eye rotates in the y-axis direction with respect to the case where the user's eye gazes at the front of the virtual screen 3200 from the front. In addition, in Equation 2, r denotes a radius of a sphere assuming that the user's eye is the sphere.

The first eye tracking sensor 161 may measure degrees of rotation (e.g., α and β) of the user's eye (e.g., the left eye) by using the method described with reference to FIGS. 3A and 3B, and the electronic device 100 may calculate a two-dimensional (2D) coordinate of the view direction of the user's eye on the virtual screen 3200 by using the degrees of rotation (α and β) of the user's eye.

Figure 3D:
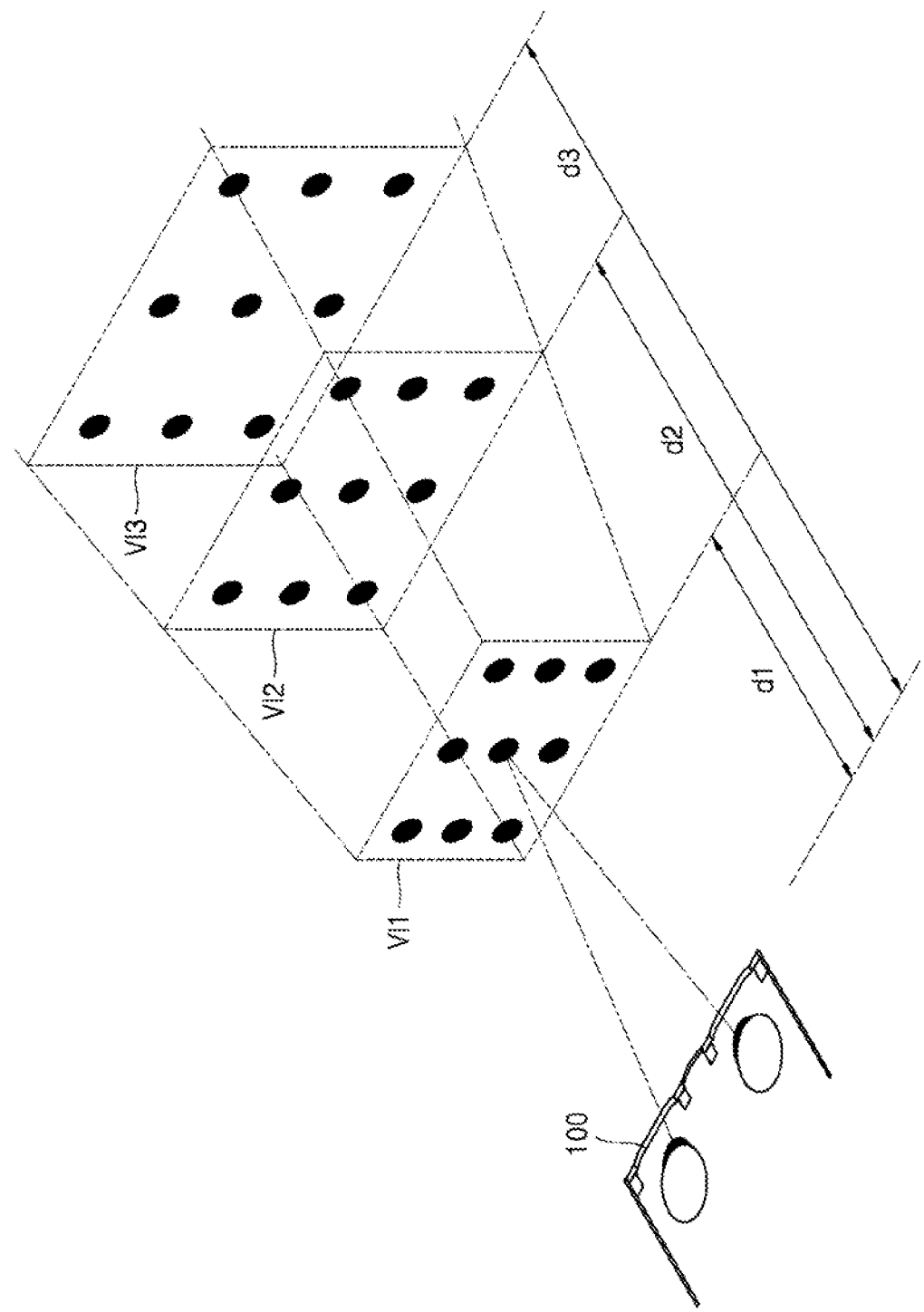
FIG. 3D is a diagram showing a method of obtaining information about a gaze point based on view information of a user according to an embodiment.

FIG. 3D is a diagram showing a method of obtaining information about a gaze point based on view information of a user according to an embodiment.

FIG. 3D shows a method, performed by an eye tracking sensor, of performing calibration according to an embodiment.

When a user first uses the electronic device 100, a process of calibrating the first eye tracking sensor 161 and the second eye tracking sensor 162 may be performed so as to accurately measure views of the user's left and right eyes. The electronic device 100 may output virtual images VI1, VI2, and VI3 having different depths (e.g., d1, d2, and d3) at which a plurality of points (generally 9) for inducing the view of a user are displayed to induce the user to gaze at with respect to each of the plurality of points.

When the user gazes at the points included in each of the virtual images VI1, VI2, and VI3, the electronic device 100 may store information (view information) output from the eye tracking sensor 160 in the form of a table.

As described in FIG. 3A, a method using an amount of light reflected from the user's cornea may use the previously stored reflection angle and information of the amount of light of a scanning mirror for each point in the form of the table as the view information, and a method of capturing the user's eye using infrared light may use the previously stored captures of the user's eye and an image including reflection light conjunctionally for each point as the view information.

The electronic device 100 may determine a view direction of the user's eye by comparing previously stored view information with view information output from an eye tracking sensor. The electronic device 100 may use view information output from the first eye tracking sensor 161 to determine the view direction of the user's left eye, and use view information output from the second eye tracking sensor 162 to determine the view direction of the user's right eye.

The electronic device 100 may use the view direction of the user's left eye, the view direction of the right eye, and a distance between both eyes to, as shown in FIG. 2, estimate coordinates of the point 201 at which the user gazes in the entire region 10.

For example, the electronic device 100 may use coordinate mapping, etc., to previously set or previously store the point 201 at which the user gazes in the form of the table such that the point 201 is mapped to 2D coordinate information (e.g., an x coordinate value and a y coordinate value) in the entire region 10 described in FIG. 1.

Figure 4A:
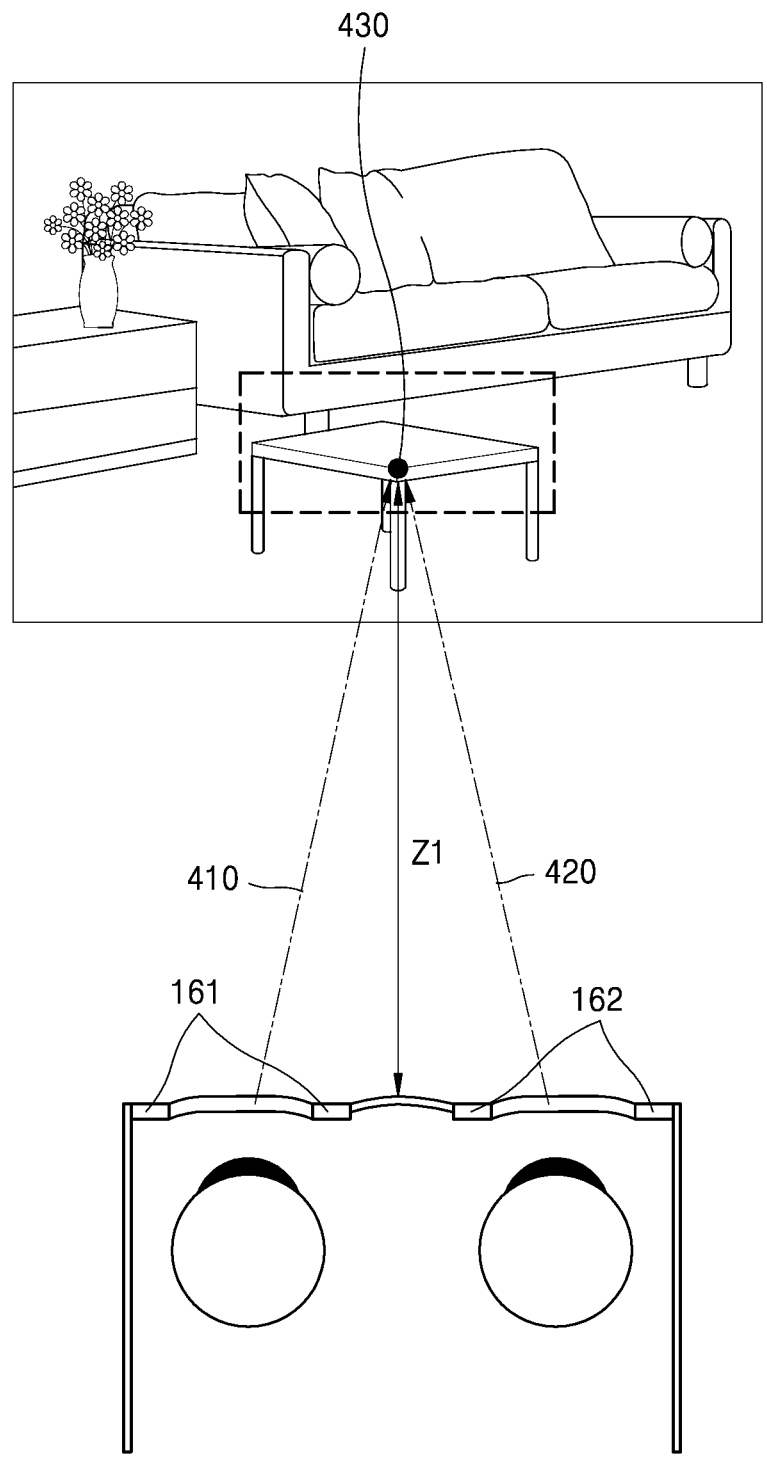
FIG. 4A is a diagram showing estimate depth information based on view information of a user, according to an embodiment.
Figure 4B:
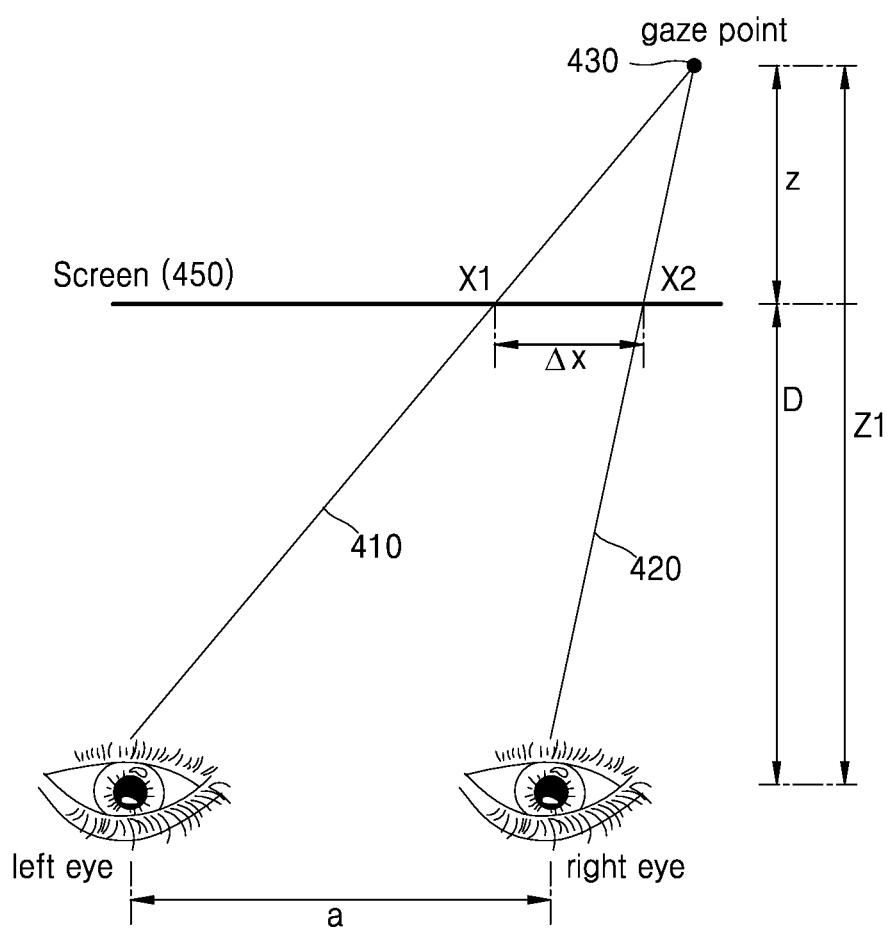
FIG. 4B is a diagram showing a method of obtaining estimate depth information based on view information of a user, according to an embodiment.

FIG. 4A is a diagram showing estimated depth information based on view information of a user, according to an embodiment. FIG. 4B is a diagram showing a method of obtaining an estimate of depth information based on view information of a user, according to an embodiment.

Referring to FIG. 4A, the electronic device 100 may estimate depth information about a point at which the user gazes by using the vergence of a view direction of the right eye and a view direction of the left eye (intersection of two virtual straight lines indicating the view direction).

For example, as shown in FIG. 4B, based on a first view direction 410 corresponding to the left eye, a second view direction 420 corresponding to the right eye, and a distance between both eyes, the electronic device 100 may calculate a distance value Z1 to a gaze point 430 (a point at which views of both eyes converge). The electronic device 100 may obtain the estimate depth information of the gaze point 430 by using view information of both eyes measured using the eye tracking sensor 160 and Equation 3 below according to the geometric arrangement shown in FIG. 4B.

$$\frac{-z}{\Delta x} = \frac{D-z}{a} \Rightarrow z = \frac{\Delta x D}{\Delta x - a}.$$ [Equation 3]

In Equation 3, $\Delta x$ denotes a difference between an x-coordinate x1 of the left eye and an x-coordinate x2 of the right eye on a virtual screen 450. In this case, it may be assumed that the y-coordinate of the left eye and the y-coordinate of the right eye are the same. In addition, in Equation 3, a denotes the distance between both eyes of the user, and a previously set value (e.g., 7 cm) may be used. Further, D denotes a distance between the user's eye and the virtual screen 450.

The electronic device 100 may obtain the distance value Z1 to the point at which both eyes of the user converge, as a sum of the z value and the D value.

Alternatively, the electronic device 100 may estimate depth information (e.g., Z1) of the gaze point 430 based on an angle formed by the first view direction 410 and the second view direction 420. The smaller the angle formed by the first view direction 410 and the second view direction 420 is, the farther the distance to the gaze point 430 is, and the larger the angle formed by the first view direction 410 and the second view direction 420 is, the closer the distance to the gaze point 430 is.

Figure 5:
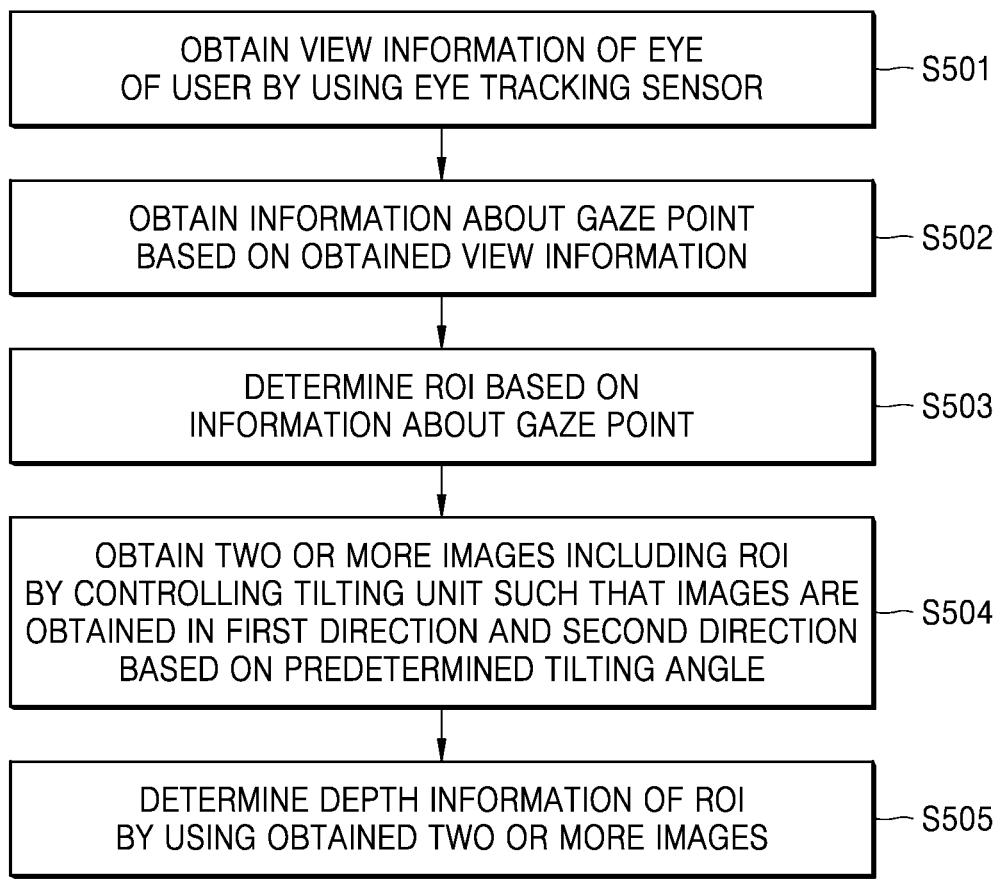
FIG. 5 is a flowchart of an operation method of an electronic device according to an embodiment.
Figure 6:
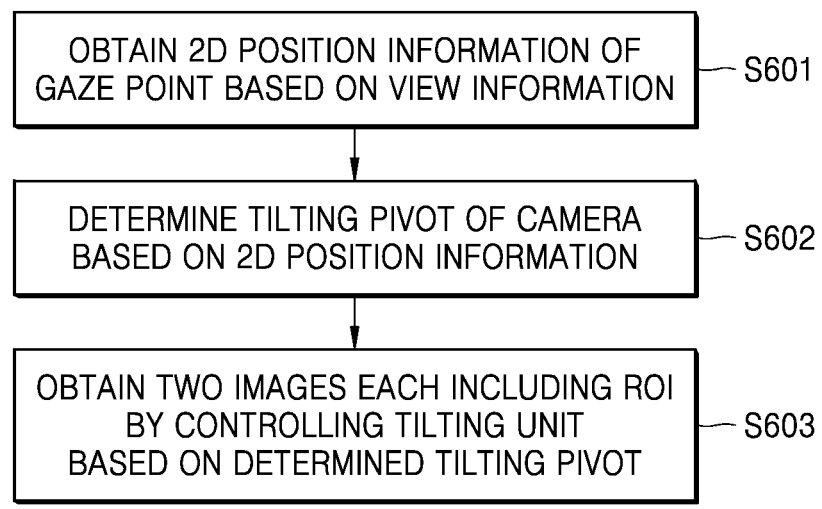
FIG. 6 is a flowchart of a method of determining a tilting pivot based on two-dimensional (2D) position information of a gaze point according to an embodiment.
Figure 7:
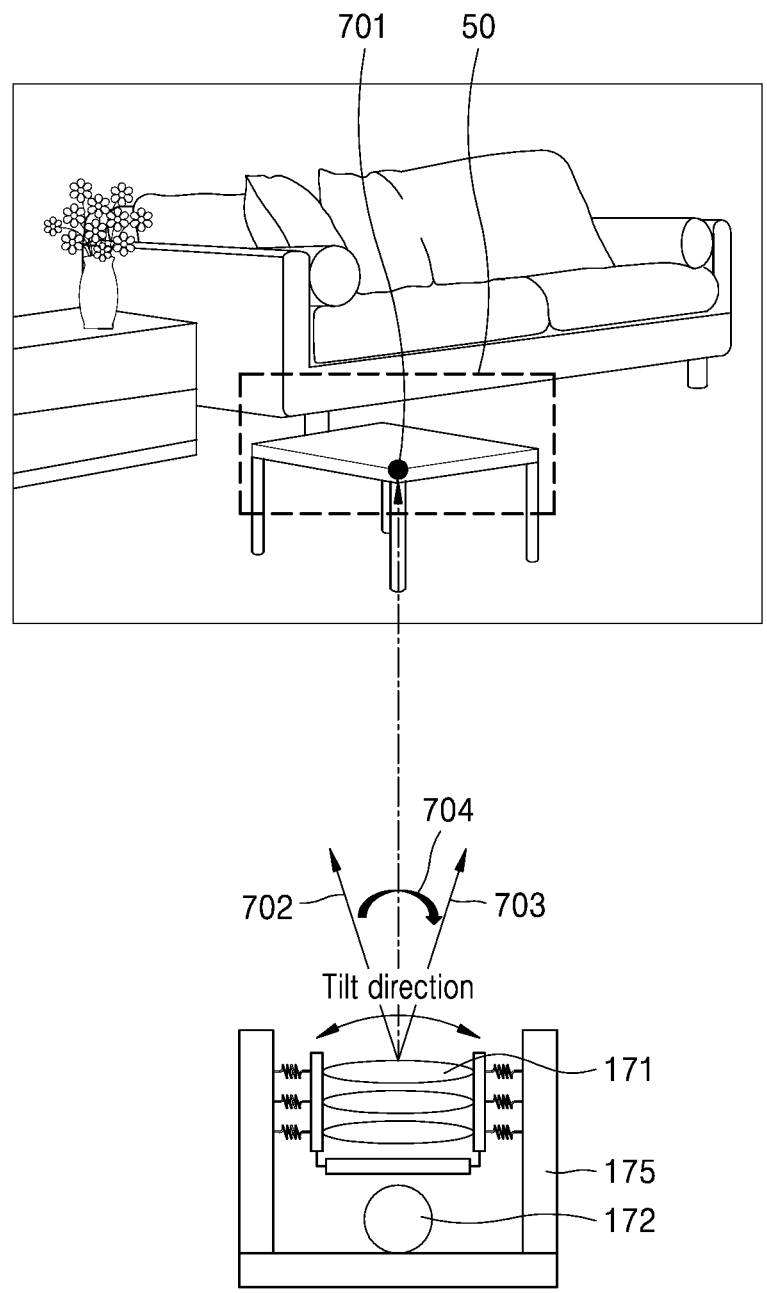
FIG. 7 is a diagram showing a method of determining a tilting pivot based on 2D position information of a gaze point according to an embodiment.
Figure 8:
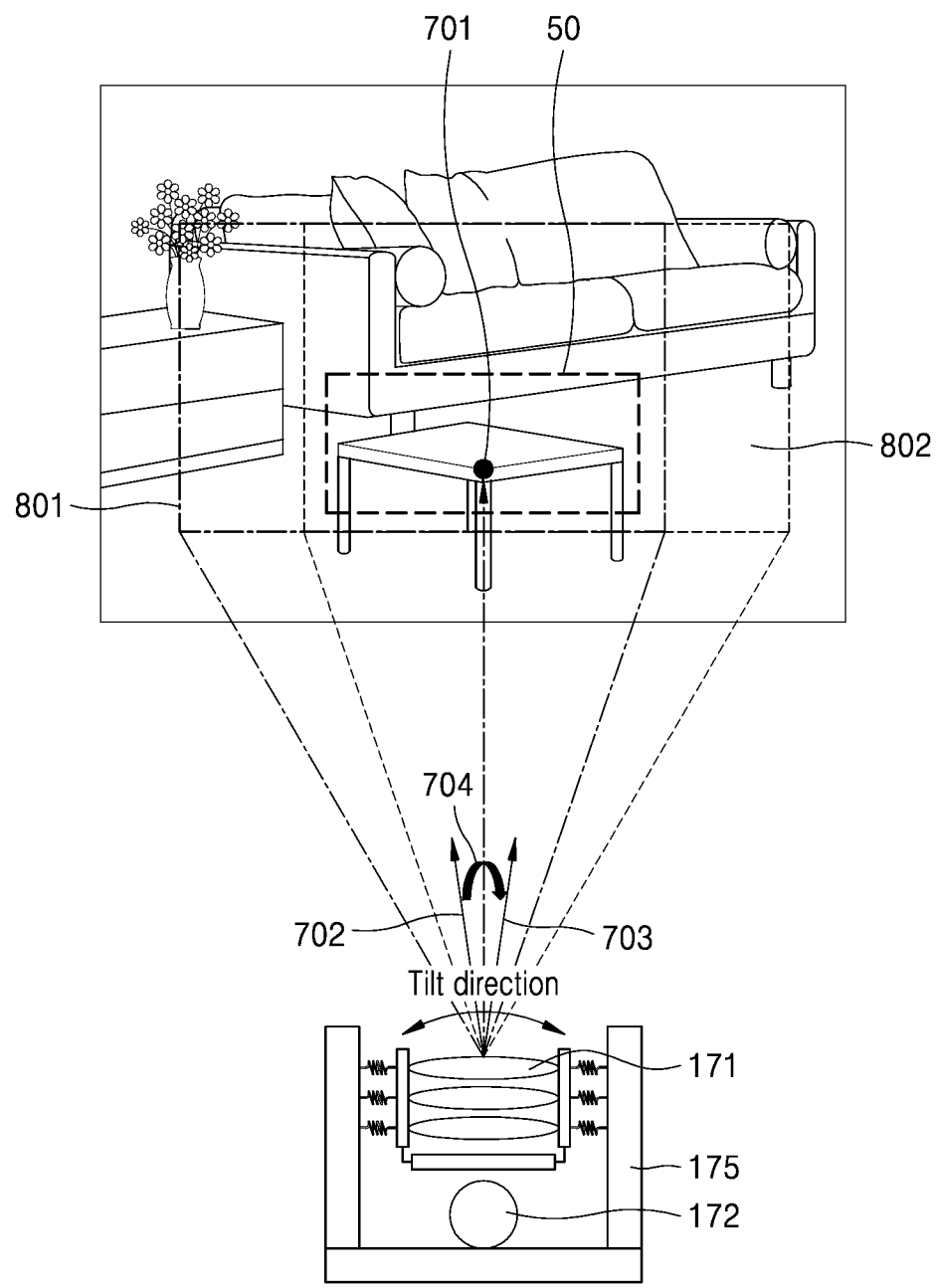
FIG. 8 is a diagram showing a method of obtaining an image including an ROI by controlling a tilting unit according to an embodiment.
Figure 9:
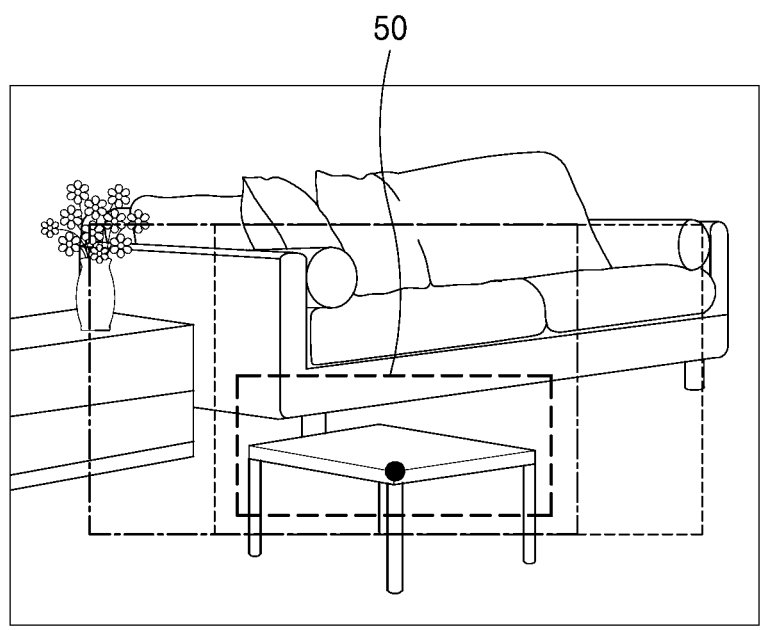
FIG. 9 is a diagram showing two images each including an ROI according to an embodiment.
Figure 9:
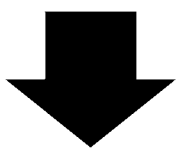
Figure 9:
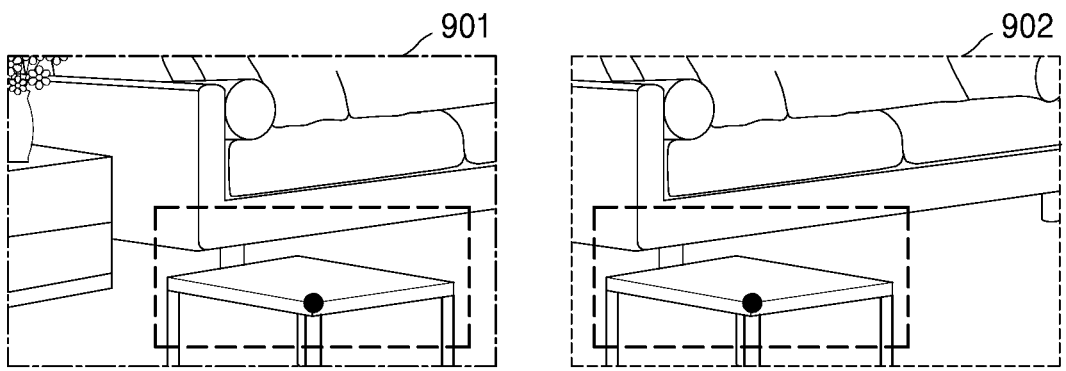

FIG. 5 is a flowchart showing an operation method of the electronic device 100 according to an embodiment. FIG. 6 is a flowchart of a method of determining a tilting pivot based on 2D position information of a gaze point according to an embodiment. FIG. 7 is a diagram showing a method of determining a tilting pivot based on 2D position information of a gaze point according to an embodiment. FIG. 8 is a diagram illustrating a method of obtaining an image including an ROI by controlling a tilting unit according to an embodiment. FIG. 9 is a diagram illustrating two images each including an ROI according to an embodiment.

FIGS. 7 to 9 are reference diagrams showing the methods of FIGS. 5 to 6.

In S501 of FIG. 5, the electronic device 100 may obtain view information of eye of the user using the eye tracking sensor 160 (see FIG. 2).

According to an embodiment, the view information may mean a view direction in which the user gazes with both eyes.

The electronic device 100 according to an embodiment may provide light to the user's eye (left eye and right eye) using the eye tracking sensor 160 and detect an amount of light reflected from the user's eye. The electronic device 100 may determine the view directions of both eyes of the user based on the detected amount of light.

Alternatively, the electronic device 100 may provide light to the user's eye and capture the user's eye using the eye tracking sensor 160. Also, the electronic device 100 may determine the view direction of both eyes of the user based on an image of the captured user's eye.

In S502 of FIG. 5, the electronic device 100 may obtain information about the gaze point based on the obtained view information.

According to an embodiment, the information about the gaze point may include 2D position information about the gaze point. According to an embodiment, the 2D position information may mean 2D coordinate information (e.g., an x coordinate value and a y coordinate value) of the gaze point at which the user gazes. FIGS. 4A to 4B may be referred to for an operation of obtaining the 2D coordinate information of the gaze point according to an embodiment.

Further, according to an embodiment, the information about the gaze point may include estimate depth information about the gaze point.

According to an embodiment, the estimate depth information may mean depth information (e.g., a z coordinate value) of the gaze point at which the user gazes. FIGS. 4A to 4B may be referred to for an operation of obtaining the estimate depth information according to an embodiment.

According to an embodiment, the electronic device 100 may obtain the 2D coordinate information (the x coordinate value and the y coordinate value) of the point at which the user gazes, based on the view direction of the user's right eye and the view direction of the left eye. In addition, the electronic device 100 may estimate a distance (a z coordinate value) to the point at which the user gazes based on the view direction of the right eye and the view direction of the left eye. Accordingly, the electronic device 100 may obtain the 2D position information and the estimate depth information of the gaze point.

In S503 of FIG. 5, the electronic device 100 may determine the ROI based on information about the gaze point.

According to an embodiment, the ROI may mean the point at which the user gazes and a previously set peripheral region with respect to the point at which the user gazes among the entire region meaning an actual space within a range sensible by the depth sensor 150 (see FIG. 1). FIG. 2 may be referred to for a method of determining the ROI according to an embodiment.

Referring to FIG. 7, according to an embodiment, the electronic device 100 may determine a gaze point 701 and a previously set peripheral region with respect to the gaze point 701 as the ROI 50.

In S504 of FIG. 5, the electronic device 100 may obtain two or more images including the ROI by controlling a tilting unit 170 (see FIG. 23) such that the two or more images are obtained in first direction and second direction based on a predetermined tilting angle.

According to an embodiment, the depth sensor 150 of the electronic device 100 may include a camera 175 (see FIG. 23) including the tilting unit 170.

According to an embodiment, the tilting unit 170 may mean a tilting actuator capable of rotating the camera 175 mounted on the electronic device 100. Even when the electronic device 100 does not rotate, the electronic device 100 may capture an image in a desired direction by rotating the camera 175 under the control of the tilting unit 170. Accordingly, the electronic device 100 may obtain a plurality of images by capturing an actual space in different directions.

According to an embodiment, the electronic device 100 may obtain two or more images respectively captured in the first and second directions under the control of the tilting unit 170. The electronic device 100 may capture an image in the first direction and capture an image in the second direction in which a capture direction of the camera 175 rotates at a previously set rotation angle (e.g., 40 degrees) under the control of the tilting unit 170. Each of the two or more images may include the ROI.

Referring to FIG. 7, the camera 175 may include a lens unit 171 mounted in a rotatable structure to enable change of the capture direction and a pivot 172 that serves as a central axis to balance the rotating lens unit 171.

The camera 175 shown in FIG. 7 is schematically illustrated for convenience of description and is not limited thereto.

Referring to FIG. 8, for example, the electronic device 100 may capture an image in a first direction 702 and capture an image in a second direction 703 that rotates the capture direction of the camera 175 to a previously set tilting angle (e.g., 40 degrees) 704. The electronic device 100 may capture a first image 801 including the ROI 50 in the first direction 702 and a second image 802 including the ROI 50 in the second direction 703.

According to an embodiment, the previously determined tilting angle is a rotatable angle in consideration of an arrangement structure and arrangement position of the camera 175 mounted on the electronic device 100 and may be a value previously set as a default value. According to an embodiment, the tilting angle may be set when the electronic device 100 is manufactured, and the set tilting angle may be reset or change according to a product use environment, but is not limited thereto.

In addition, according to an embodiment, the electronic device 100 may set the tilting angle such that the two or more images are captured in two directions movable to the minimum from the current position of the camera 175 at the capture time of the camera 175. Accordingly, power consumption of the electronic device 100 may be minimized by minimizing the movement of the camera 175.

In S505 of FIG. 5, the electronic device 100 according to an embodiment may determine depth information of the ROI using the obtained two or more images.

According to an embodiment, the electronic device 100 may use difference information between the two or more images viewed by the camera 175 according to the change in the capture direction due to the rotation of the camera 175 to calculate the depth information (distance) of a specific object based on the principle of triangulation. A person feels a stereoscopic effect through the difference between images entering the left eye and the right eye, and a depth sensor measures the distance in a similar manner to the principle that the person's eye feels the stereoscopic effect. For example, when the depth is small (when the distance is close), the difference between images captured from different directions is large, and when the depth is large (when the distance is far), the difference between images captured from different directions is small.

According to an embodiment, the electronic device 100 may obtain depth information about a real space including the ROI by using difference information between two or more images captured in different directions such that each of the images includes the ROI.

Referring to FIG. 9, the electronic device 100 may determine depth information of the ROI 50 included in a first image 901 captured in a first direction and a second image captured in a second direction according to a change in the capture direction due to rotation of the camera 175.

For example, the electronic device 100 may use a triangulation algorithm to calculate the depth information of a region (e.g., a table) included in the ROI 50 based on the first image 901 and the second image 902.

According to an embodiment, the electronic device 100 may extract a matching part of the first image 901 and the second image 902. The electronic device 100 may extract difference information between the first image 901 and the second image 902 based on the matching part of the first image 901 and the second image 902. The electronic device 100 may calculate the depth information of the ROI 50 using the triangulation algorithm based on the difference information between the first image 901 and the second image 902.

In addition, according to an embodiment, the electronic device 100 may obtain two or more images according to the change in the capture direction due to the rotation of the camera 175. The electronic device 100 may determine the depth information of the ROI 50 using the two or more images.

According to an embodiment, the electronic device 100 may obtain two or more images each including a ROI and determines depth information of the ROI rather than the entire space, and thus the calculation speed may increase and the power consumption may decrease.

FIG. 6 is a flowchart of a method of determining the tilting pivot based on the 2D position information of the gaze point according to an embodiment.

In S601 of FIG. 6, the electronic device 100 may obtain the 2D position information of the gaze point based on view information. FIGS. 2 and 3C may be referred to for a method of obtaining the 2D position information of the gaze point based on the view information according to an embodiment of the disclosure.

In S602 of FIG. 6, the electronic device 100 may determine a tilting pivot of a camera based on the 2D position information of the gaze point.

According to an embodiment, the electronic device 100 may determine the tilting pivot of the camera based on the 2D position information (e.g., an x coordinate value and a y coordinate value) of the gaze point.

Referring to FIG. 7, for example, the electronic device 100 may determine the gaze point 701 (FIG. 7) as the tilting pivot, but is not limited thereto.

In S602 of FIG. 6, the electronic device 100 may obtain two or more images each including an ROI by controlling a tilting unit based on the determined tilting pivot.

Referring to FIG. 8, for example, the electronic device 100 may rotate the camera 175 based on the tilting pivot (the gaze point 701), thereby capturing two images 801 and 802 each including the ROI 50 in the first direction 702 and the second direction 703.

As shown in FIG. 9, the electronic device 100 may obtain a first image 901 captured in the first direction 702 and a second image 902 captured in the second direction 703.

FIGS. 5 to 9 illustrate an example embodiment and the disclosure is not limited thereto.

Figure 10:
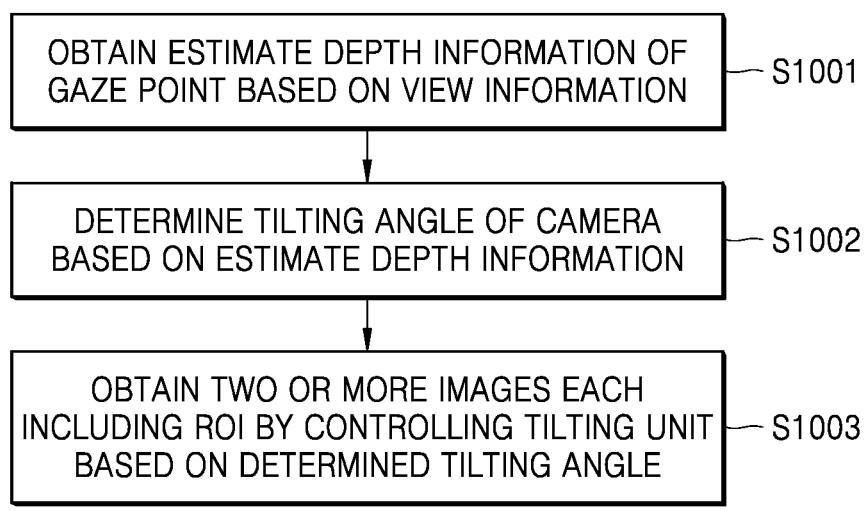
FIG. 10 is a flowchart of a method of determining a tilting angle according to an embodiment.
Figure 11:
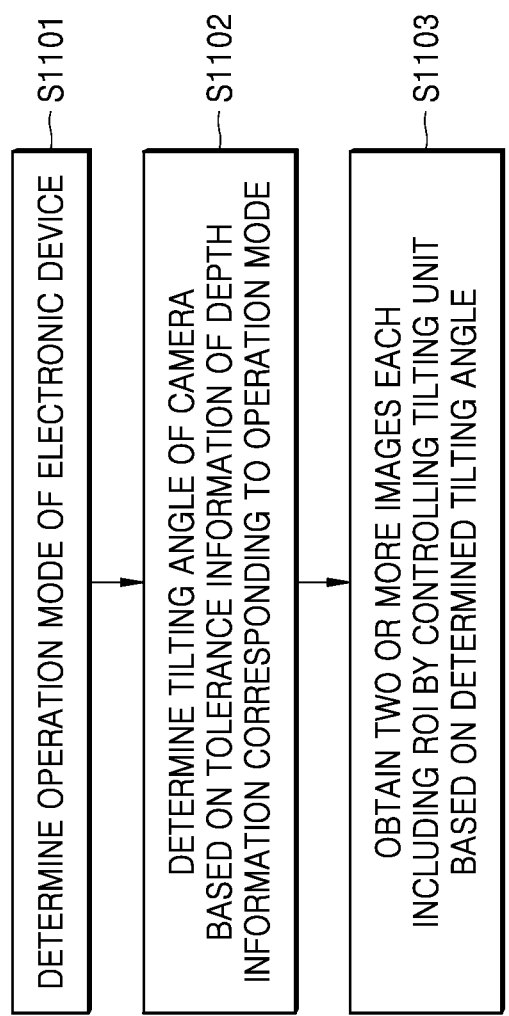
FIG. 11 is a flowchart of a method of determining a tilting angle according to another embodiment.
Figure 12:
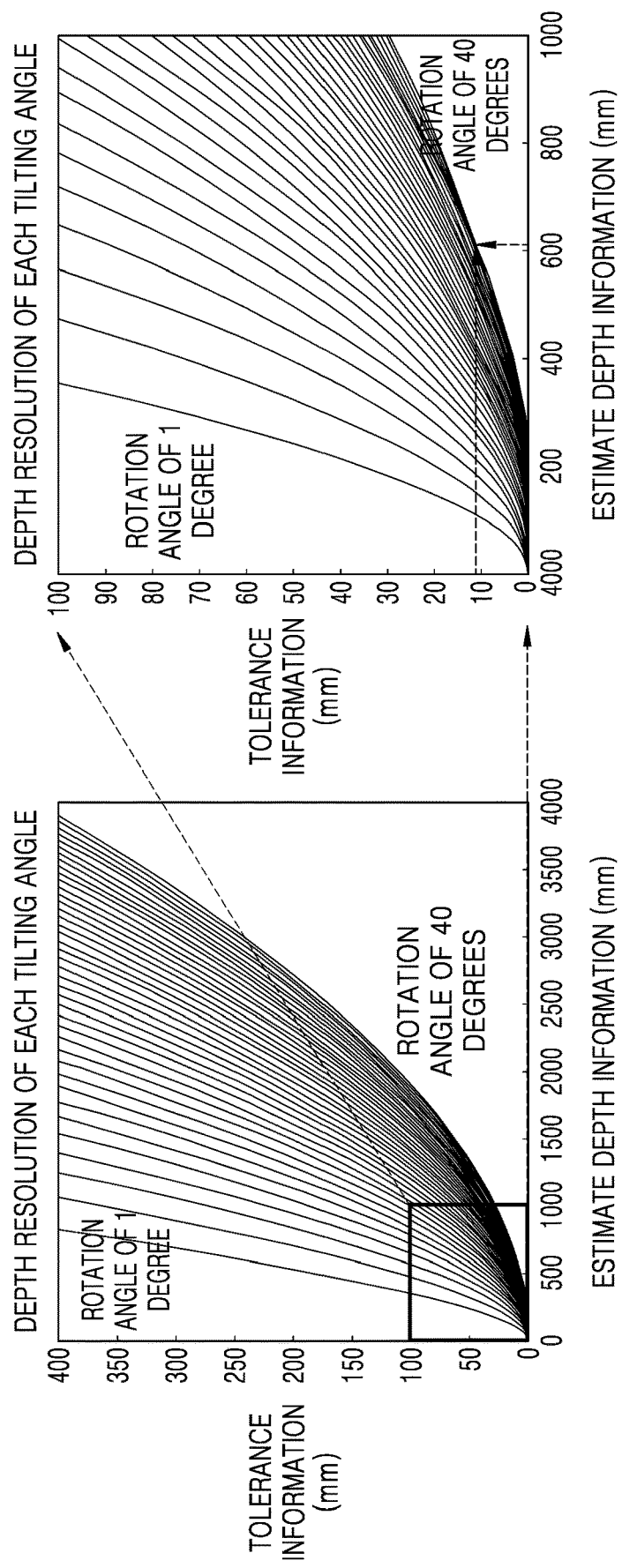
FIG. 12 is a diagram showing a method of determining a tilting angle according to an embodiment.

FIG. 10 is a flowchart showing an example of a method of determining a tilting angle according to an embodiment. FIG. 11 is a flowchart showing another example of a method of determining a tilting angle according to an embodiment. FIG. 12 is a diagram illustrating a method of determining a tilting angle according to an embodiment. FIG. 12 is a reference diagram illustrating the method of FIGS. 10 to 11.

According to an embodiment, the electronic device 100 may use graph information of FIG. 12 to determine an optimal tilting angle for obtaining two images each including an ROI when rotating a camera and capturing an image in first and second directions.

The graphs of FIG. 12 show depth resolutions for each tilting angle.

The horizontal axis of the graphs may indicate estimate depth information, and the vertical axis of the graphs may indicate tolerance information. According to an embodiment, a tilting angle corresponding to a point where certain estimate depth information (the horizontal axis) and certain tolerance information (the vertical axis) meet may be determined as an optimal tilting angle.

According to an embodiment, the graph information of FIG. 12 may be stored previously in the form of a table, or may be formulated and stored previously as an algorithm.

FIG. 10 is a flowchart of a method of determining the optimal tilting angle based on estimate depth information of a gaze point according to an embodiment.

In S1001 of FIG. 10, the electronic device 100 may obtain the estimate depth information of the gaze point based on view information. FIGS. 4A to 4B may be referred to for a method of obtaining the estimate depth information of the gaze point according to an embodiment.

In S1002 of FIG. 10, the electronic device 100 may determine the tilting angle of the camera based on the estimate depth information.

According to an embodiment, the electronic device 100 may determine the optimal tilting angle based on the estimate depth information of the gaze point.

According to an embodiment, the electronic device 100 may determine the optimal tilting angle based on the estimate depth information of the gaze point using the graph information of FIG. 12.

Referring to FIG. 12, for example, when the estimate depth information of the gaze point is 600 mm and the tolerance information is 10 mm, the electronic device 100 may determine 40 degrees corresponding to a point where 600 mm of the horizontal axis and 10 mm of the vertical axis meet as the tilting angle.

In S1003 of FIG. 10, the electronic device 100 may obtain two or more images each including an ROI by controlling a tilting unit based on the determined tilting angle.

For example, the electronic device 100 may capture a first image including the ROI in a first direction based on the determined tilting angle (e.g., 40 degrees), and capture a second image including the ROI in a second direction that rotates by 40 degrees from the first direction.

FIG. 11 is a flowchart of a method of determining the tilting angle according to another embodiment.

FIG. 11 shows a method of determining an optimal tilting angle based on tolerance information of depth information corresponding to an operation mode.

In S1101 of FIG. 11, the electronic device 100 may determine the operation mode of the electronic device 100.

For example, the operation mode of the electronic device 100 may be a hand gesture mode. The hand gesture mode may be a mode in which a user's hand gesture is recognized, the recognized hand gesture is determined as an input signal, and a certain function corresponding to the recognized hand gesture is performed.

For example, in the hand gesture mode, the electronic device 100 may be set to allow an error of approximately 10 mm in calculating depth information to an object (a user's hand) sensed through a camera.

In S1102 of FIG. 11, the electronic device 100 may determine a tilting angle of the camera based on the tolerance information of the depth information corresponding to the operation mode.

Referring to FIG. 12, for example, when the depth information from the camera to the user's hand is 600 mm and the tolerance information in the hand gesture mode is 10 mm, the electronic device 100 may determine 40 degrees corresponding to a point where 600 mm of the horizontal axis and 10 mm of the vertical axis meet as the tilting angle.

In S1103 of FIG. 11, the electronic device 100 may obtain two or more images each including the ROI by controlling the tilting unit based on the determined tilting angle.

For example, the electronic device 100 may capture a first image including the ROI in a first direction based on the determined tilting angle (e.g., 40 degrees), and capture a second image including the ROI in a second direction that rotates by 40 degrees from the first direction.

FIGS. 10 to 12 shows an example embodiment and the disclosure is not limited thereto.

Figure 13:
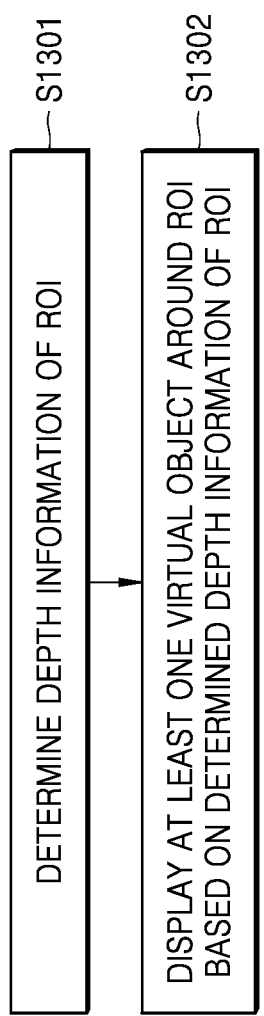
FIG. 13 is a flowchart of a method of displaying a virtual object around an ROI, according to an embodiment.
Figure 14:
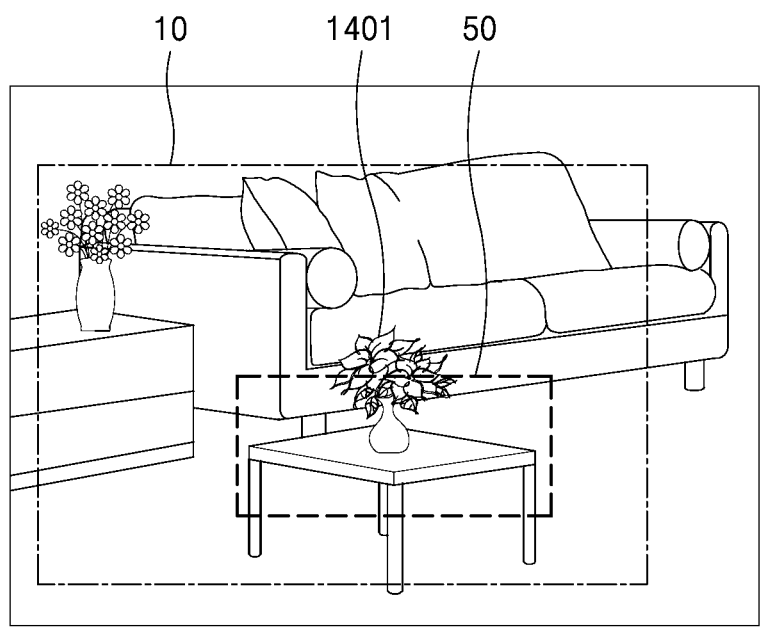
FIG. 14 is a diagram showing an example of displaying a virtual object around an ROI, according to an embodiment.

FIG. 13 is a flowchart of a method of displaying a virtual object around an ROI, according to an embodiment. FIG. 14 is a diagram showing an example of displaying a virtual object 1401 around the ROI 50, according to an embodiment. FIG. 14 is a reference diagram showing the method of FIG. 13.

In S1301 of FIG. 13, the electronic device 100 may determine depth information of the ROI. In S1302, the electronic device 100 according to an embodiment of the disclosure may display at least one virtual object around the ROI based on the determined depth information of the ROI.

The electronic device 100 may display the virtual object on the display 140 based on the depth information of the ROI. For example, the electronic device 100 may display the virtual object in the form of an augmented reality (AR). In case of displaying the virtual object in the form of AR, the electronic device 100 may display the virtual object on a display 140 (FIG. 24) such that the virtual object overlaps a real space (2D or 3D space of the real world) observed through the display 140.

Referring to FIG. 14, for example, the electronic device 100 may obtain depth information of the ROI 50 (for example, a region around a table) among the entire space 10, provide the virtual object 1401 (e.g., a potted plant image) with a depth similar to the depth information of the ROI 50 and display the virtual object 1401 on the display 140 (FIG. 24) to make a user recognize the virtual object 1401 as though it is located in the ROI 50 (for example, the region around the table).

FIGS. 13 to 14 shows an example embodiment and the disclosure is not limited thereto.

Figure 15:
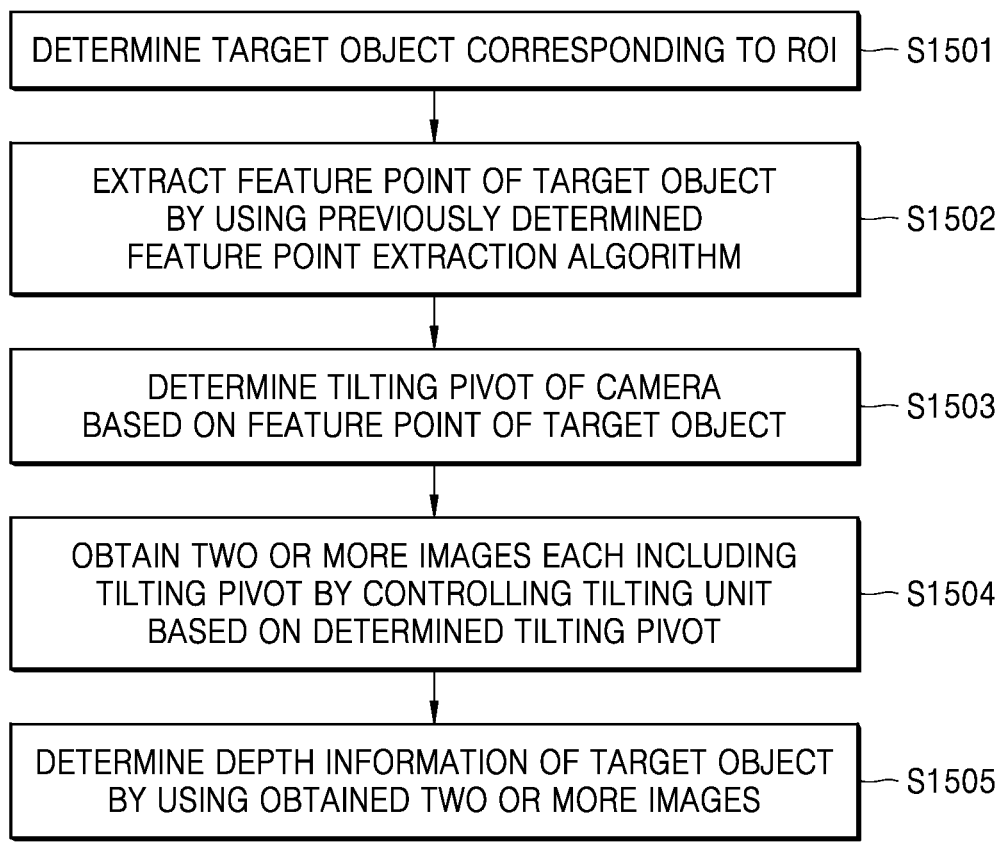
FIG. 15 is a flowchart showing a method of determining depth information of a target object according to an embodiment.
Figure 16:
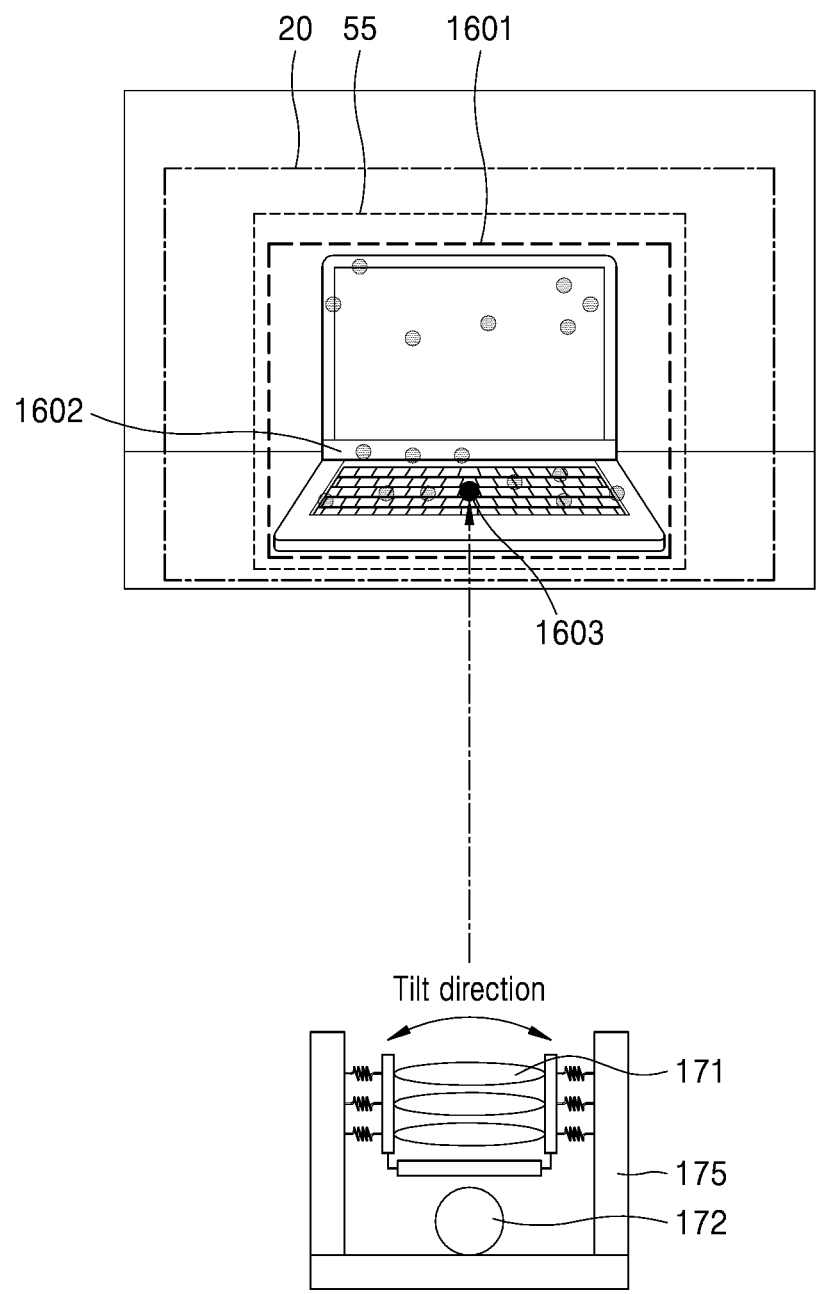
FIG. 16 is a diagram showing a method of obtaining an image including a target object according to an embodiment.
Figure 17:
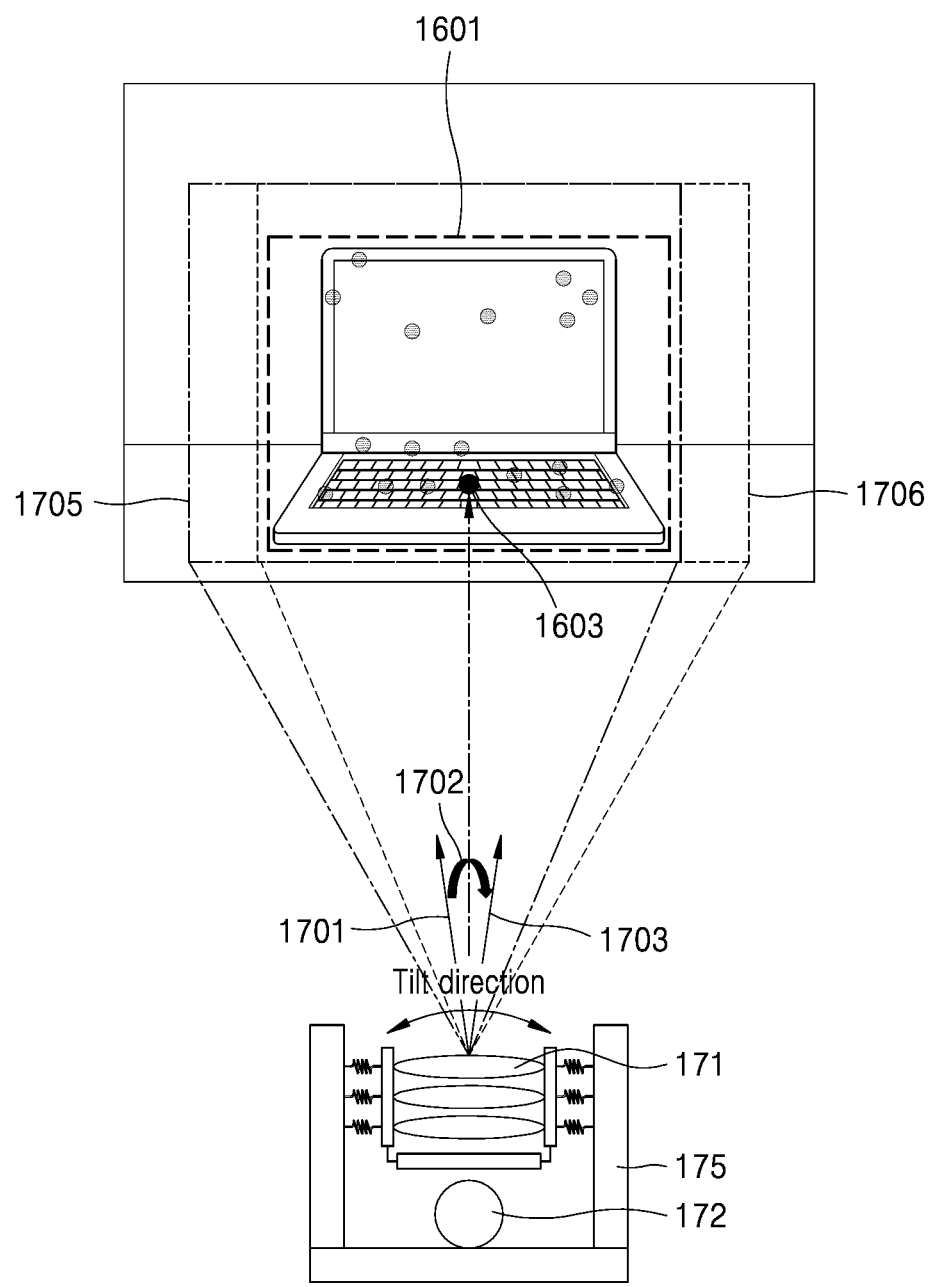
FIG. 17 is a diagram showing two images each including a target object according to an embodiment.

FIG. 15 is a flowchart of a method of determining depth information of a target object according to an embodiment. FIG. 16 is a diagram showing a method of obtaining an image including a target object 1601 according to an embodiment. FIG. 17 is a diagram showing two images each including the target object 1601 according to an embodiment.

FIGS. 16 to 17 are reference diagrams showing the method of FIG. 15.

In S1501 of FIG. 15, the electronic device 100 may determine a target object corresponding to an ROI.

According to an embodiment, the electronic device 100 may detect view information of a user and obtain information about a gaze point of the user based on the view information. The electronic device 100 may determine the ROI based on information about the gaze point. S501, S502, and S503 of FIG. 5 may be referred to for a method of determining the ROI.

Referring to FIG. 16, according to an embodiment, the electronic device 100 may obtain an image of the entire space 20 and recognize a major object (e.g., notebook) in the determined ROI 55 by using an object recognition technology. According to an embodiment, the electronic device 100 may determine the recognized object as the target object 1601.

Also, according to an embodiment, the electronic device 100 may analyze the external shape of the target object 1601 by using a certain image analysis algorithm. Referring to FIG. 16, for example, the electronic device 100 may analyze the external shape of the notebook determined as the target object 1601.

In S1502 of FIG. 15, the electronic device 100 may extract a feature point of the target object by using a previously determined feature point extraction algorithm.

Referring to FIG. 16, the electronic device 100 may extract a feature point on the external shape of the target object 1601 (e.g., the notebook) by using the previously determined feature point extraction algorithm.

In S1503 of FIG. 15, the electronic device 100 may determine a tilting pivot of a camera based on the feature point of the target object.

Referring to FIG. 16, the electronic device 100 may determine a tilting pivot 1603 of a camera based on the feature point of the target object 1601 (e.g., the notebook). The electronic device 100 may determine an advantageous feature point as the tilting pivot 1603 for measuring depth information based on the external shape of the target object 1601 (e.g., the notebook).

For example, when the target object 1601 is the notebook, a display region may be deformed in real time according to an image displayed on a screen, but a keyboard region is a region that is not deformed and is a region that is easily identified from the surroundings, and thus the feature point of the keyboard region may be determined as the tilting pivot 1603.

In S1504 of FIG. 15, the electronic device 100 may obtain two or more images each including the tilting pivot by controlling a tilting unit based on the determined tilting pivot.

Referring to FIG. 17, for example, the electronic device 100 may obtain two images 1705 and 1706 each including the tilting pivot 1603 by controlling the tilting unit such that the two or more images are captured in a first direction 1701 and a second direction 1703 according to a previously determined tilting angle 1702 based on the tilting pivot 1603.

In S1505 of FIG. 15, the electronic device 100 may determine depth information of the target object by using the obtained two or more images.

Referring to FIG. 17, according to an embodiment, the electronic device 100 may calculate the depth information of the target object 1601 based on the principle of triangulation, using the difference information between the two images 1705 and 1706.

FIGS. 15 to 17 shows an example embodiment, but the disclosure is not limited thereto.

Figure 18:
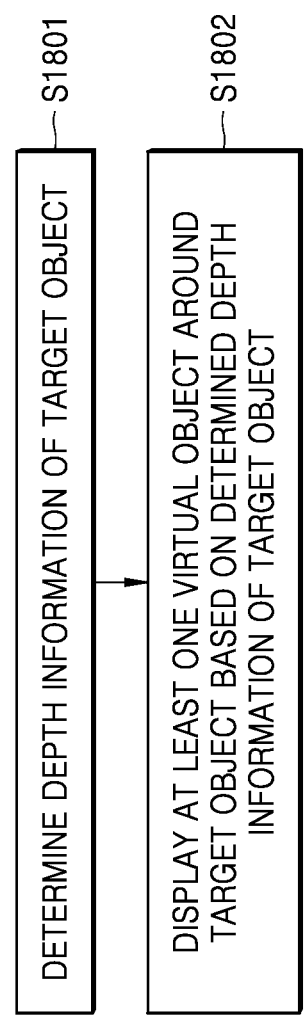
FIG. 18 is a flowchart of a method of displaying a virtual object around a target object, according to an embodiment.
Figure 19:
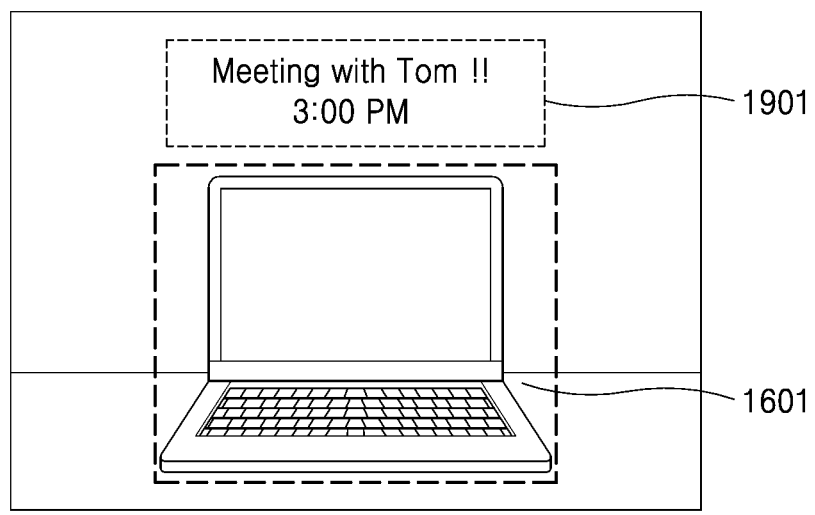
FIG. 19 is a diagram showing an example of displaying a virtual object around a target object, according to an embodiment.
Figure 20:
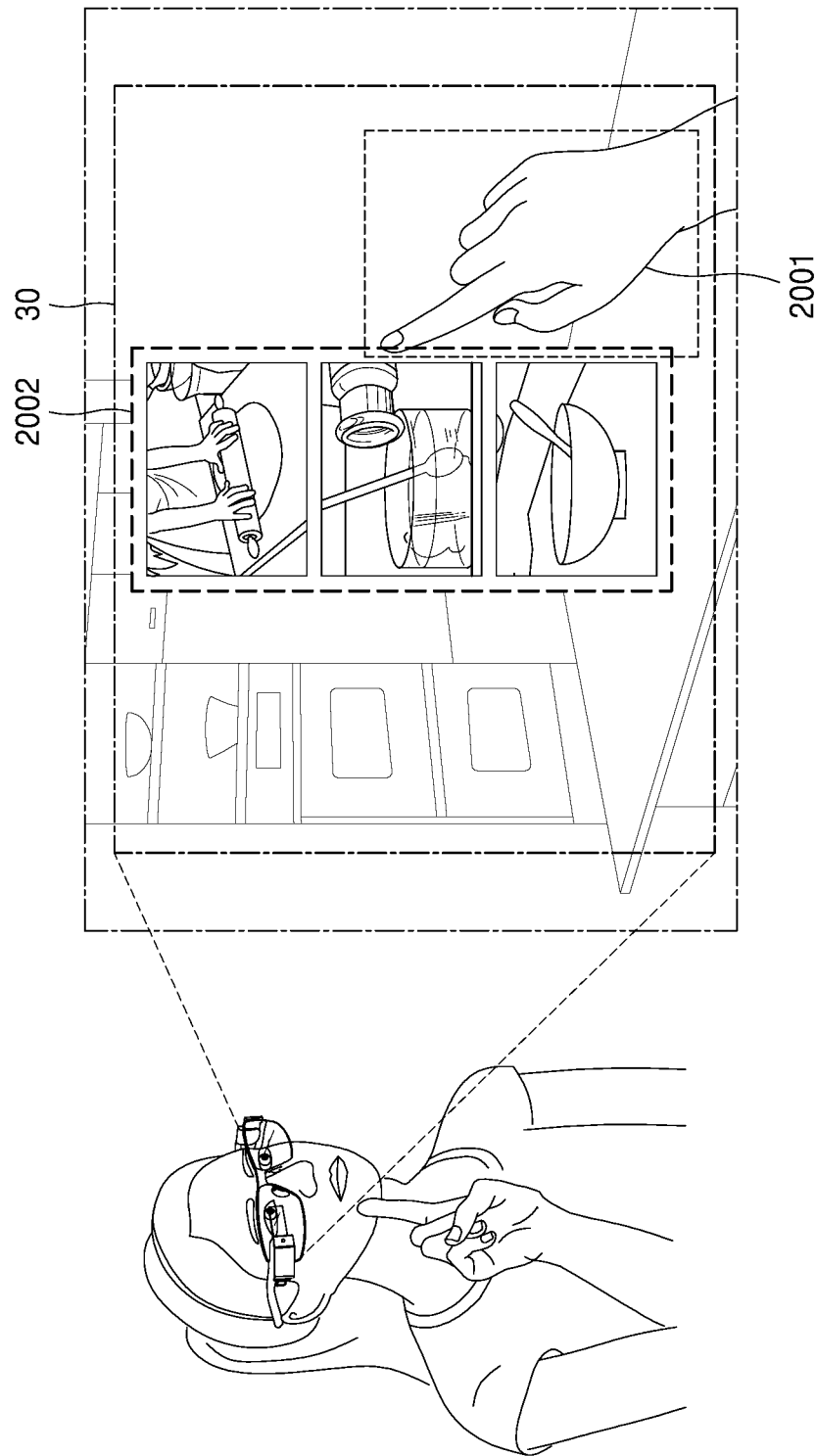
FIG. 20 is a diagram showing another example of displaying a virtual object around a target object, according to an embodiment.

FIG. 18 is a flowchart showing an example of displaying a virtual object around a target object, according to an embodiment. FIG. 19 is a diagram showing an example of displaying a virtual object around a target object 2201, according to an embodiment. FIG. 20 is a diagram showing another example of displaying a virtual object around a target object, according to an embodiment.

FIGS. 19 to 20 are reference diagrams showing the method of FIG. 18.

In S1801 of FIG. 18, the electronic device 100 may determine depth information of the target object. In S1802, the electronic device 100 may display at least one virtual object around the target object based on the determined depth information of the target object.

The electronic device 100 may display the virtual object on the display 140 (see FIG. 24) based on the depth information of the target object. For example, the electronic device 100 may display the virtual object in the form of AR. When displaying the virtual object in the form of AR, the electronic device 100 may display the virtual object on the display 140 such that the virtual object overlaps the real space observed through the display 140.

Referring to FIG. 19, for example, the electronic device 100 may obtain depth information of the target object (e.g., a notebook) 1601, provide the virtual object 1901 (e.g., text "Meeting with Tom!! 3:00 PM") with a depth similar to the depth information of the target object 1601 and display the virtual object 1901 on the display 140 (FIG. 24) to make a user recognize the virtual object 1901 as though it is located in target object 1601.

FIG. 20 shows an example in which the electronic device 100 determines a user's hand 2001 as a target object according to an embodiment.

For example, when a user who wears the electronic device 100 on his/her head holds his/her hand, the user's hand 2001 may be recognized in a real space 30 sensed by a camera of the electronic device 100. The electronic device 100 may determine the user's hand 2001 as the target object.

The electronic device 100 may display a virtual object on the display 140 based on depth information of the target object (e.g., the user's hand 2001). For example, the electronic device 100 may display the virtual object in the form of AR.

Referring to FIG. 20, for example, the electronic device 100 may obtain depth information of the target object (e.g., the user's hand) 2001, provide a virtual object e.g., a cooking recipe image) 2002 with a depth similar to the depth information of the target object 2001 and display the virtual object 2002 on the display 140 to make a user recognize the target object 2001 as though it is located in a surrounding region of the target object 2001.

FIGS. 18 to 20 show an example embodiment and the disclosure is not limited thereto.

Figure 21:
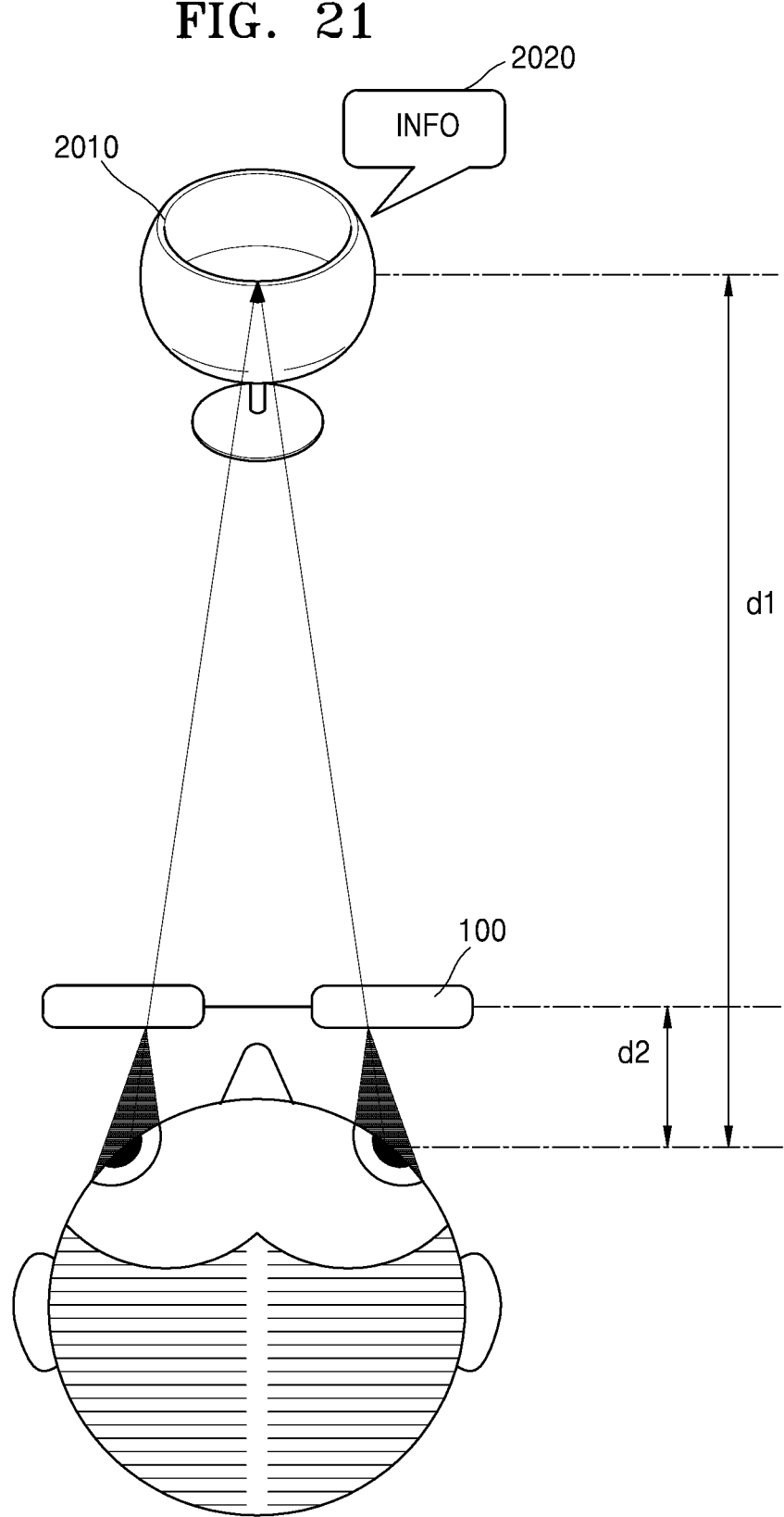
FIG. 21 is a diagram showing a focus of a user according to display of a virtual object, according to an embodiment.
Figure 22:
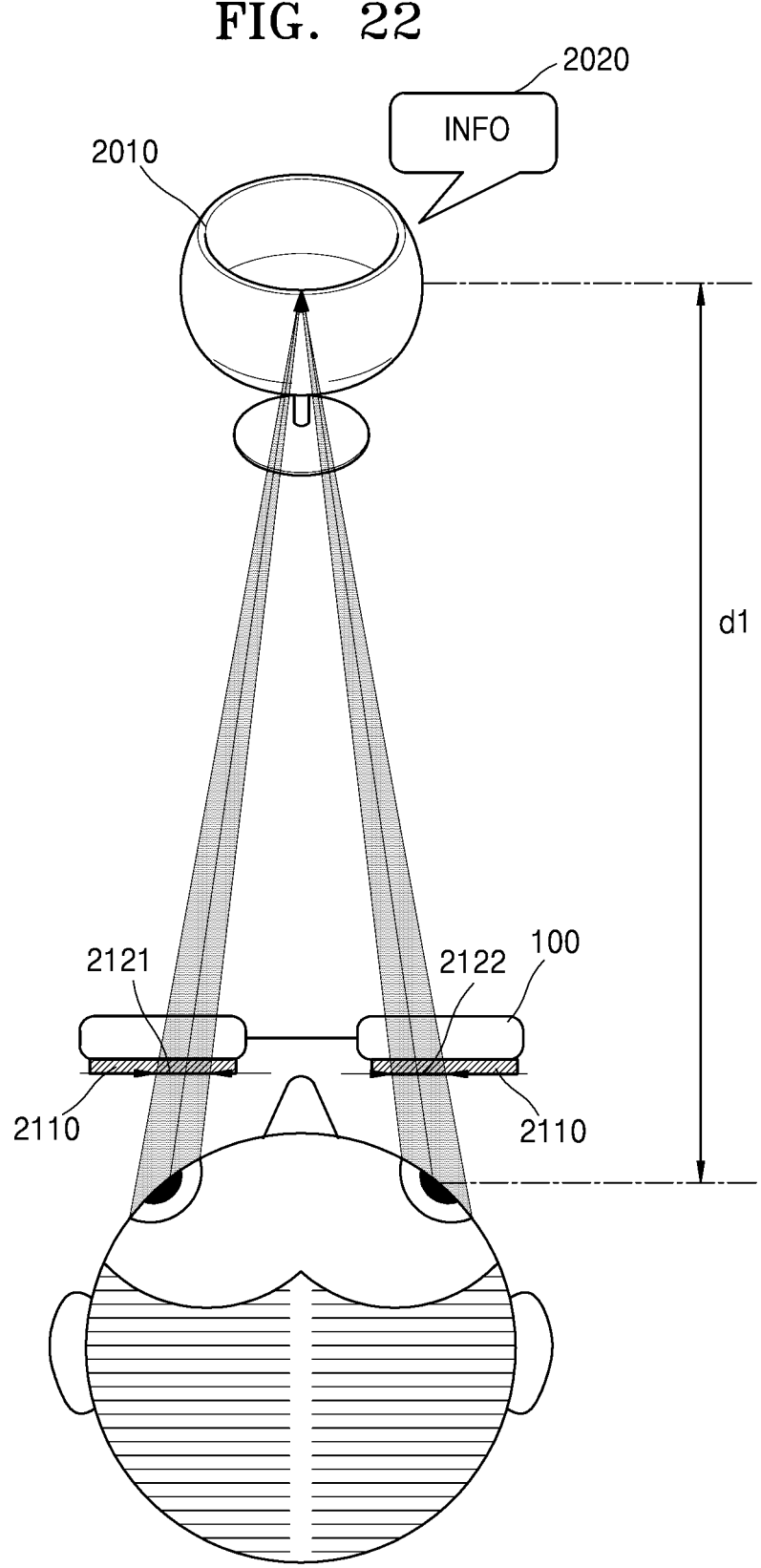
FIG. 22 is a diagram showing a method of adjusting focus of a user according to an embodiment.

FIG. 21 is a diagram showing a focus of a user according to a displayed virtual object, according to an embodiment. FIG. 22 is a diagram showing a method of adjusting a focus of a user according to an embodiment.

Referring to FIG. 21, when the electronic device 100 displays a virtual object 2020 as though the virtual object 2020 is located around a real object 2010, a user may experience a convergence-accommodation conflict phenomenon. For example, when a distance from the electronic device 100 to the real object 2010 is d1, the electronic device 100 may display the virtual object 2020 as though it is located at the distance d1. At this time, because the virtual object 2020 looks like it is located at the distance d1, a vergence distance of both eyes of the user is d1. Meanwhile, because the virtual object 2020 is actually displayed on the display of the electronic device 100, the focal distance of both eyes of the user is a distance d2 from the user's eye to the display. In this case, the vergence distance and the focal distance do not match, and when the electronic device 100 is used for a long time, a user feels vertigo, dizziness, motion sickness, and the like.

Accordingly, in order to alleviate the vergence-accommodation conflict, the electronic device 100 according to an embodiment may adjust the focal distance.

Referring to FIG. 22, according to an embodiment, the electronic device 100 may include a focus adjustment lens 2110. The focus adjustment lens 2110 may mean an optical element capable of adjusting optical properties such as the focal distance or an optical axis position, but is not limited thereto. For example, the effective refractive index of the focus adjustment lens 2110 may locally vary according to the applied voltage. In general, a liquid crystal may be used for the focus adjustment lens 2110, but is not limited thereto.

The electronic device 100 may obtain view information of the user by using an eye tracking sensor, and based on the view information of the user, obtain information about a gaze point (for example, the real object 2010), and obtain depth information about the gaze point based on the information about the gaze point. This is described in detail in FIGS. 1 to 20, and thus a detailed description thereof is omitted.

Also, the electronic device 100 may display the virtual object 2020 based on depth information about the real object 2010. For example, the electronic device 100 may display the virtual object 2020 on the display 140 (FIG. 24) to make a user recognize the virtual object 2020 as though it is located around the real object 2010 observed through the display.

The electronic device 100 may adjust the focal distance based on depth information (or depth information of the virtual object 2020) of the real object 2010. For example, when the distance to the real object 2010 is d1, the electronic device 100 may adjust the focal distance of the user's eye to d1 by using the focus adjustment lens 2110. In this case, the electronic device 100 may obtain information about a first region 2121 and a second region 2122 through which the user's view passes among the entire region of the focus adjustment lens 2110, based on the view information of the user. The electronic device 100 may change the refractive index such that the focal distances of the first region 2121 and the second region 2122 are d1 by adjusting the voltage applied to the focus adjustment lens 2110. Accordingly, the vergence distance and the focal distance may match, and a vergence control mismatch phenomenon may be prevented.

Figure 24:
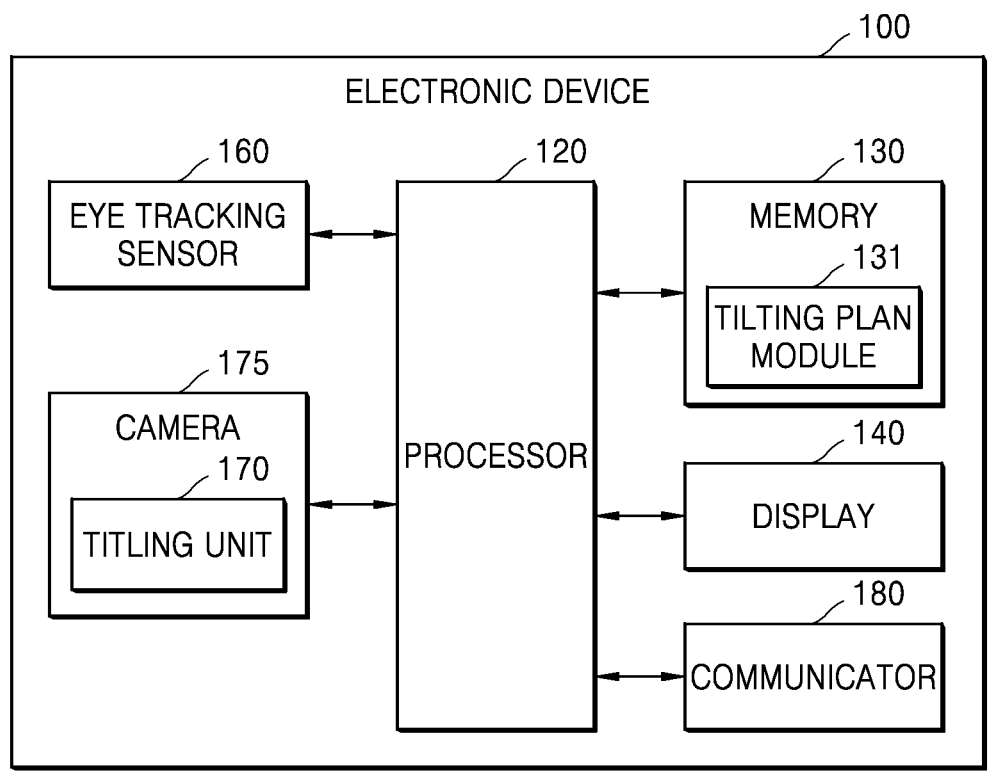
FIG. 24 is a detailed block diagram of an electronic device according to an embodiment.

FIG. 23 is a block diagram of an electronic device 100 according to an embodiment of the disclosure. FIG. 24 is a detailed block diagram of the electronic device 100 according to an embodiment of the disclosure.

As shown in FIG. 23, the electronic device 100 according to an embodiment may include an eye tracking sensor 160, a camera 175 including a tilting unit 170, and a processor 120. However, all of the components shown in FIG. 23 are not indispensable components of the electronic device 100. The electronic device 100 may be implemented by more components than the components shown in FIG. 23, or the electronic device 100 may be implemented by less components than the components shown in FIG. 23.

For example, as shown in FIG. 24, the electronic device 100 according to an embodiment of the disclosure may further include a memory 130, a display 140, and a communicator 180, in addition to the eye tracking sensor 160 and the camera 175 including the tilting unit 170 and the processor 120.

The eye tracking sensor 160 according to an embodiment may include an illuminator that provides light to the user's eye and a detector that detects light. The illuminator may include a light source that provides light and a scanning mirror that controls a direction of the light provided from the light source. The scanning mirror may control a direction such that the light provided from the light source is directed toward the user's eye (e.g., a cornea). The detector may detect the light reflected from the user's eye 320 and measure the amount of the detected light. The eye tracking sensor 160 may track the view of both eyes of the user based on the measured amount of light.

Alternatively, the eye tracking sensor 160 according to an embodiment may include an illuminator and a capturer. The illuminator may include an infrared light emitting diode (IR LED) or the like and may provide light (e.g., infrared light) to the user's eye when capturing the user's eye. As light is provided to the user's eye, the reflection light may be generated in the user's eye. In addition, the capturer may include at least one camera. In this regard, the at least one camera may include an infrared camera IR. The capturer may capture the users' eye. The eye tracking sensor 160 may track view of the both eyes of the user based on an image of the user's eye.

The camera 175 according to an embodiment may obtain an image frame such as a still image or a moving image. The camera 175 may capture an image outside the electronic device 100. In this case, the image captured by the camera 175 may be processed through the processor 120 or a separate image processor (not shown). For example, the camera 175 may be an RGB camera.

The processor 120 according to an embodiment of the disclosure may generally control the electronic device 100. The processor 120 according to an embodiment of the disclosure may execute one or more programs stored in the memory 130.

The memory 130 according to an embodiment may store various data, programs, or applications for driving and controlling the electronic device 100. A program stored in the memory 130 may include one or more instructions. The program (one or more instructions) or an application stored in the memory 130 may be executed by the processor 120.

The memory 130 according to an embodiment may store a program for processing and controlling the processor 120, and input/output data (e.g., data input through a virtual input interface, a virtual input interface, sensing information measured by a sensor, content, etc.)

Programs stored in the memory 130 may be classified into a plurality of modules according to their functions, and may include, for example, a tilting plan module 131. According to an embodiment, the processor 120 may determine a tilting angle of the camera by calling the tilting plan module 131.

According to an embodiment, the tilting plan module 131 may store a matching table or algorithm for determining the tilting angle of the camera described in FIG. 12. For example, the matching table or algorithm may be stored in a ROM.

When driving the camera, the processor 120 may load the matching table or algorithm stored in the ROM into RAM by calling the tilting plan module 131, and determine the tilting angle of the camera by using the loaded matching table or algorithm.

The memory 130 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The electronic device 100 may operate a web storage or a cloud server on the internet which performs a storage function of the memory 140.

The processor 120 according to an embodiment may obtain information about a gaze point based on the detected view information. The processor 120 may determine the ROI based on the information about the gaze point. The processor 120 may obtain two or more images each including the ROI by controlling the tilting unit 170 such that the two or more images are captured in first and second directions based on a previously determined tilting angle. The processor 120 may determine depth information of the ROI using the obtained two or more images.

The processor 120 may obtain the 2D position information of the gaze point based on view information. The processor 120 may determine a tilting pivot of the camera 175 based on the 2D position information and control the tilting unit 170 based on the determined tilting pivot.

Also, the processor 120 may obtain estimate depth information of the gaze point based on view information. The processor 120 may determine the tilting angle of the camera 175 based on the estimate depth information and control the tilting unit 170 based on the determined tilting angle.

Also, the processor 120 may determine the operation mode of the head-mounted electronic device 100 and determine the tilting angle of the camera 175 based on the tolerance information of the depth information corresponding to the operation mode. The processor 120 may control the tilting unit 170 based on the determined tilting angle.

Also, the processor 120 may control the display 140 to display at least one virtual object around the ROI based on the determined depth information of the ROI.

In addition, the processor 120 may determine a target object corresponding to the ROI, and extract a feature point of the target object using a previously determined object analysis algorithm. The processor 120 may determine a tilting pivot of the camera 175 based on the feature point of the target object, and control the tilting unit 170 based on the determined tilting pivot. The processor 120 may obtain two or more images each including the tilting pivot by controlling the tilting unit 170 based on the determined tilting pivot. The processor 120 may determine depth information of the target object by using the obtained two or more images.

Further, the processor 120 may control the display 140 to display at least one virtual object around the target object based on the determined depth information of the target object.

In addition, the processor 120 may determine depth information of the ROI by using the obtained two or more images using an algorithm for calculating the depth information.

The display 140 may display and output information processed by the electronic device 100. For example, the display 140 may display a virtual object.

According to an embodiment, the display 140 may provide an AR image. The display 140 according to an embodiment may include a wave guide and a display module. When the user wears the electronic device 100, the wave guide may include a transparent material in which a partial region of the rear surface is visible. The wave guide may be configured as a single-layer or multi-layered flat plate including a transparent material through which light is reflected and propagates. The wave guide may receive light of a projected virtual image by facing the exit surface of a display module. Here, the term "transparent material" means a material through which light is capable of passing, the transparency may not be 100%, and may have a certain color.

According to an embodiment, because the wave guide includes a transparent material, the user may view the virtual object of the virtual image through the display 140 as well as an external real scene, and thus the wave guide may be referred to as a see through display. The display 140 may provide an AR image by outputting the virtual object of the virtual image through the wave guide.

The communicator 180 may include one or more components that enable communication between the electronic device 100 and an external device or between the electronic device 100 and a server.

For example, the communicator 180 may include a short range communicator, a mobile communicator, and a broadcast receiver.

The short-range communicator may include a Bluetooth communicator, a short-range wireless communicator (NFC/RFID unit), a WLAN (Wi-Fi) communicator, a Zigbee communicator, an infrared data association (IrDA) communicator, an ultra wideband (UWB) communicator, an Ant+ communicator, etc., but is not limited thereto.

The mobile communicator may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcast receiver receives a broadcast signal and/or broadcast-related information from outside through broadcast channels. Broadcast channels may include satellite channels and terrestrial channels. Depending on implementation examples, the electronic device 100 may not include a broadcast receiver.

The above-described embodiments may be written as programs executable on a computer, and be implemented by a general-purpose digital computer for operating the programs by using a computer-readable medium. Data structures used in the afore-described embodiments of the disclosure may be recorded on the computer-readable medium via a variety of means. The afore-described embodiments of the disclosure may be implemented in the form of a recording medium including instructions executable by the computer, e.g., a program module executed by the computer. For example, methods implemented by software modules or algorithms may be stored in a computer-readable medium as computer-readable codes or program commands executable by the computer.

The computer-readable medium may be an arbitrary recording medium accessible by the computer, and examples thereof may include volatile, non-volatile, detachable, and non-detachable media. Examples of the computer-readable medium include magnetic storage media (e.g., read-only memory (ROM), floppy disks, and hard disks) and optical recording media (e.g., compact disc-ROM (CD-ROM) and digital versatile discs (DVDs)), but are not limited thereto The computer-readable medium may include a computer storage medium and a communication medium.

A plurality of computer-readable recording media may be distributed over network-coupled computer systems, and data, e.g., program instructions and codes, stored in the distributed recording media may be executed by at least one computer.

Particular implementations described herein merely correspond to embodiments of the disclosure and do not limit the scope of the disclosure in any way. For brevity, descriptions of known electronic configurations, control systems, software, and other functional aspects of the systems may not be provided herein.

While the disclosure has been particularly shown and described with reference to example embodiments thereof, it will be understood by one of ordinary skill in the art that various changes in form and details may be made therein without departing from the scope of the disclosure. Therefore, it should be understood that the afore-described example embodiments are illustrative in all aspects and do not limit the disclosure. For example, each element described as a single element may be implemented in a distributed manner and, likewise, elements described as distributed elements may be implemented in a combined manner.

All examples and terms used herein are merely for a detailed description and the scope of the disclosure is not limited by those examples and terms unless defined in the claims.

Moreover, no element is essential for implementation of the disclosure unless the element is particularly described as being "essential" or "critical".

It will be understood by one of ordinary skill in the art that the embodiments may be modified without departing from the scope of the disclosure.

It should be understood that various changes in form and details may be made in the embodiments and that the embodiments cover all modifications, equivalents, and alternatives falling within the scope of the disclosure. Therefore, the afore-described embodiments should be considered in a descriptive sense only and not for purposes of limitation.

The scope of the disclosure is defined not by the detailed description of the disclosure but by the appended claims, and all variations derived from the scope defined by the claims and their equivalents will be construed as being included in the scope of the disclosure.

As used herein, the term " . . . unit" or "module" denotes an entity for performing at least one function or operation, and may be implemented using hardware, software, or a combination of hardware and software.

The "unit" or "module" may also be implemented as a program stored in an addressable storage medium and executable by a processor.

For example, the term "unit" or "module" may be implemented as elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

As used herein, the expression "A may include one of a1, a2, and a3" broadly means that an example of an element that may be included in element A is a1, a2, or a3.

The expression does not limit the element that may be included in element A, to a1, a2, or a3. Therefore, it should be noted that the expression is not restrictively construed to exclude elements other than a1, a2, and a3, from examples of the element that may be included in A.

The expression means that A may include a1, include a2, or include a3. The expression does not mean that elements included in A are always selectively determined within a certain set. For example, it should be noted that the expression is not restrictively construed to limit the element included in element A, to a1, a2, or a3 selected from a set including a1, a2, and a3.

What is claimed is:

1. An electronic device comprising:
   at least one eye tracking sensor configured to obtain view information corresponding to viewing direction of eyes of a user;
   a camera;
   a tilting unit configured to adjust a direction of the camera;
   a memory storing one or more instructions; and
   at least one processor configured to execute the one or more instructions to:
      obtain information about a gaze point of the user based on the obtained view information, the information about the gaze point of the user including depth information of the gaze point of the user;
      determine a region of interest (ROI) based on the information about the gaze point;
      determine a tilting angle of the camera based on the depth information of the gaze point of the user;
      obtain two or more images including the ROI by controlling the tilting unit such that the two or more images are obtained by the camera in a first direction and a second direction based on the determined tilting angle; and
      determine depth information of the ROI by using the obtained two or more images.

2. The electronic device of claim 1, wherein the at least one processor is further configured to:
   obtain two-dimensional (2D) position information of the gaze point, based on the view information,
   determine a tilting pivot of the camera, based on the 2D position information, and
   control the tilting unit to tilt the camera, based on the determined tilting pivot.

3. The electronic device of claim 1, wherein the at least one processor is further configured to:
   determine an operation mode of the electronic device,
   determine the tilting angle of the camera, based on tolerance information of depth information corresponding to the operation mode, and
   control the tilting unit to tilt the camera based on the determined tilting angle.

4. The electronic device of claim 1, further comprising a display, and
   wherein the at least one processor is further configured to control the display to display at least one virtual object that appears to be at a depth of the ROI, based on the determined depth information of the ROI.

5. The electronic device of claim 1, wherein the at least one processor is further configured to:
   determine a target object within the ROI,
   extract a feature point of the target object by using a predetermined object analysis algorithm,
   determine a tilting pivot of the camera, based on the feature point of the target object, and
   control the tilting unit to tilt the camera based on the determined tilting pivot.

6. The electronic device of claim 5, wherein the at least one processor is further configured to:
   obtain two or more images each based on the determined tilting pivot being applied to the camera, by controlling the tilting unit based on the determined tilting pivot, and
   determine depth information of the target object by using the obtained two or more images.

7. The electronic device of claim 5, further comprising a display, and
   wherein the at least one processor is further configured to control the display to display at least one virtual object that appears to be at a depth of the target object, based on the determined depth information of the target object.

8. The electronic device of claim 1, wherein the at least one processor is further configured to determine the depth information of the ROI by using the obtained two or more images, based on an algorithm for calculating depth information.

9. An operation method of an electronic device, the operation method comprising:
    obtaining, by at least one eye tracking sensor, view information corresponding to viewing direction of eyes of a user;
    obtaining information about a gaze point of the user based on the obtained view information the information about the gaze point of the user including depth information of the gaze point of the user;
    determining a region of interest (ROI) based on the information about the gaze point;
    determining a tilting angle of a camera based on the depth information of the gaze point of the user;
    obtaining two or more images including the ROI by controlling a tilting unit such that the two or more images are obtained in a first direction and a second direction based on a the determined tilting angle; and
    determining depth information of the ROI by using the obtained two or more images.

10. The operation method of claim 9, wherein the obtaining of the information about the gaze point comprises obtaining two-dimensional (2D) position information of the gaze point, based on the view information,
    wherein the obtaining of the two or more images comprises:
    determining a tilting pivot of the camera, based on the 2D position information, and
    wherein the controlling of the tilting unit comprises controlling the tilting unit to tilt the camera, based on the determined tilting pivot.

11. The operation method of claim 9, wherein the obtaining of the two or more images comprises:
    determining an operation mode of the electronic device,
    determining the tilting angle of the camera, based on tolerance information of depth information corresponding to the operation mode, and
    controlling the tilting unit to tilt the camera based on the determined tilting angle.

12. The operation method of claim 9, further comprising displaying at least one virtual object that appears to be at a depth of the ROI, based on the determined depth information of the ROI.

13. The operation method of claim 9, wherein the obtaining of the two or more images comprises:
    determining a target object within the ROI,
    extracting a feature point of the target object by using a predetermined object analysis algorithm,
    determining a tilting pivot of-a the camera based on the feature point of the target object, and
    controlling the tilting unit to tilt the camera based on the determined tilting pivot.

14. The operation method of claim 13, wherein the obtaining of the two or more images comprises obtaining two or more images each based on the determined tilting pivot being applied to the camera, by controlling the tilting unit based on the determined tilting pivot, and
    wherein the obtaining of the depth information of the gaze point comprises determining depth information of the target object by using the obtained two or more images.

15. The operation method of claim 13, further comprising displaying at least one virtual object that appears to be at a depth of the target object, based on the determined depth information of the target object.

16. The operation method of claim 9, wherein the determining of the depth information of the ROI comprises determining the depth information of the ROI by using the obtained two or more images, based on an algorithm for calculating depth information.

* * * * *